US011435924B2

(12) United States Patent
Akutsu et al.

(10) Patent No.: US 11,435,924 B2
(45) Date of Patent: Sep. 6, 2022

(54) STORAGE SYSTEM AND STORAGE COST OPTIMIZATION METHOD

(71) Applicant: Hitachi, Ltd., Tokyo (JP)

(72) Inventors: Hiroaki Akutsu, Tokyo (JP); Takahiro Naruko, Tokyo (JP); Akifumi Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 318 days.

(21) Appl. No.: 16/812,683

(22) Filed: Mar. 9, 2020

(65) Prior Publication Data

US 2020/0301595 A1 Sep. 24, 2020

(30) Foreign Application Priority Data

Mar. 22, 2019 (JP) .............................. JP2019-055662

(51) Int. Cl.
*G06F 3/06* (2006.01)
*G06Q 30/06* (2012.01)

(52) U.S. Cl.
CPC .......... *G06F 3/0644* (2013.01); *G06F 3/0605* (2013.01); *G06F 3/067* (2013.01); *G06Q 30/0645* (2013.01)

(58) Field of Classification Search
None
See application file for complete search history.

(56) References Cited

U.S. PATENT DOCUMENTS 9,727,470 B1 * 8/2017 Cande ..................... G06F 3/067
10,789,228 B2 * 9/2020 Nagao ................. G06F 16/2379
2002/0152143 A1 10/2002 Sanada et al.
2003/0236758 A1 12/2003 Iwatani et al.
2006/0075129 A1 4/2006 Hood et al.
2010/0138311 A1 6/2010 Pieraldi et al.
2013/0346537 A1 * 12/2013 Fitzpatrick .......... H04L 67/1097
709/213
2017/0286518 A1 10/2017 Horowitz et al.

FOREIGN PATENT DOCUMENTS

JP 2002-312689 A 10/2002
JP 2004-21799 A 1/2004
JP 2012048386 A * 3/2012 ............. G06Q 10/06

OTHER PUBLICATIONS

Extended European Search Report issued in corresponding EP Application No. 20163377.3 (dated Jul. 9, 2020).
European Office Action dated Nov. 25, 2021, issued in corresponding EP Application No. 20163377.3.
Japanese Office Action received in corresponding Japanese Application No. 2019-055662 dated Mar. 29, 2022.

* cited by examiner

*Primary Examiner* — Brian R Peugh
(74) *Attorney, Agent, or Firm* — Mattingly & Malur, PC

(57) ABSTRACT

An object of the invention is to optimize a storage cost for data. There is provided a storage system including a storage device, a memory, and a processor configured to control input and output of data to and from the storage device. The processor monitors a storage amount that is at least one of a write amount (a total amount of data received as a write target) and a physical use amount (a total amount of data physically stored in the storage device), and a read amount (a total amount of data that is read), and calculates a fee as a storage cost that is a cost related to use of the storage device in a target period, based on a storage amount and a read amount in the target period in accordance with a monitoring result.

15 Claims, 13 Drawing Sheets

FIG. 2A

READ TABLE
1141

| VIRTUAL | USER ID | LOGICAL READ AMOUNT IN LATEST PERIOD | LOGICAL READ AMOUNT IN EACH PAST PERIOD |
|---|---|---|---|
| PHYSICAL | USER ID | PHYSICAL READ AMOUNT IN LATEST PERIOD | PHYSICAL READ AMOUNT IN EACH PAST PERIOD |

FIG. 2B

WRITE TABLE
1142

| VIRTUAL | USER ID | WRITE AMOUNT IN LATEST PERIOD | WRITE AMOUNT IN EACH PAST PERIOD |
|---|---|---|---|
| PHYSICAL | USER ID | PHYSICAL USE AMOUNT IN LATEST PERIOD | PHYSICAL USE AMOUNT IN EACH PAST PERIOD |

FIG. 2C

SYSTEM TABLE
1143

| VIRTUAL | VIRTUAL STORAGE CONFIGURATION |
|---|---|
| PHYSICAL | PHYSICAL STORAGE CONFIGURATION |

FIG. 2D

PAGE TABLE
1144

| LOGICAL PAGE ID | PHYSICAL PAGE ID | PAGE-ASSOCIATED DETAILS (READ FREQUENCY OR COMPRESSION RATE) |
|---|---|---|

FIG. 2E

COST TABLE
1145

| READ COST | CALCULATION COST | PHYSICAL STORAGE COST | LOGICAL STORAGE COST IN LATEST PERIOD | LOGICAL STORAGE COST IN EACH PAST PERIOD |
|---|---|---|---|---|

FIG. 2F

USER SETTING TABLE
1146

| USER ID | STORAGE COST CONDITION | READ COST CONDITION | ERROR RATE CONDITION | PRIVACY LEVEL CONDITION | FORGETTING CURVE | ERROR OBJECTIVE FUNCTION | PRESET |
|---|---|---|---|---|---|---|---|

FIG. 2G

DISPLAY TABLE
1147

| USER ID | LOGICAL STORAGE COST | READ COST | FORGETTING CURVE | ERROR OBJECTIVE FUNCTION | PRIVACY LEVEL |
|---|---|---|---|---|---|

FIG. 6

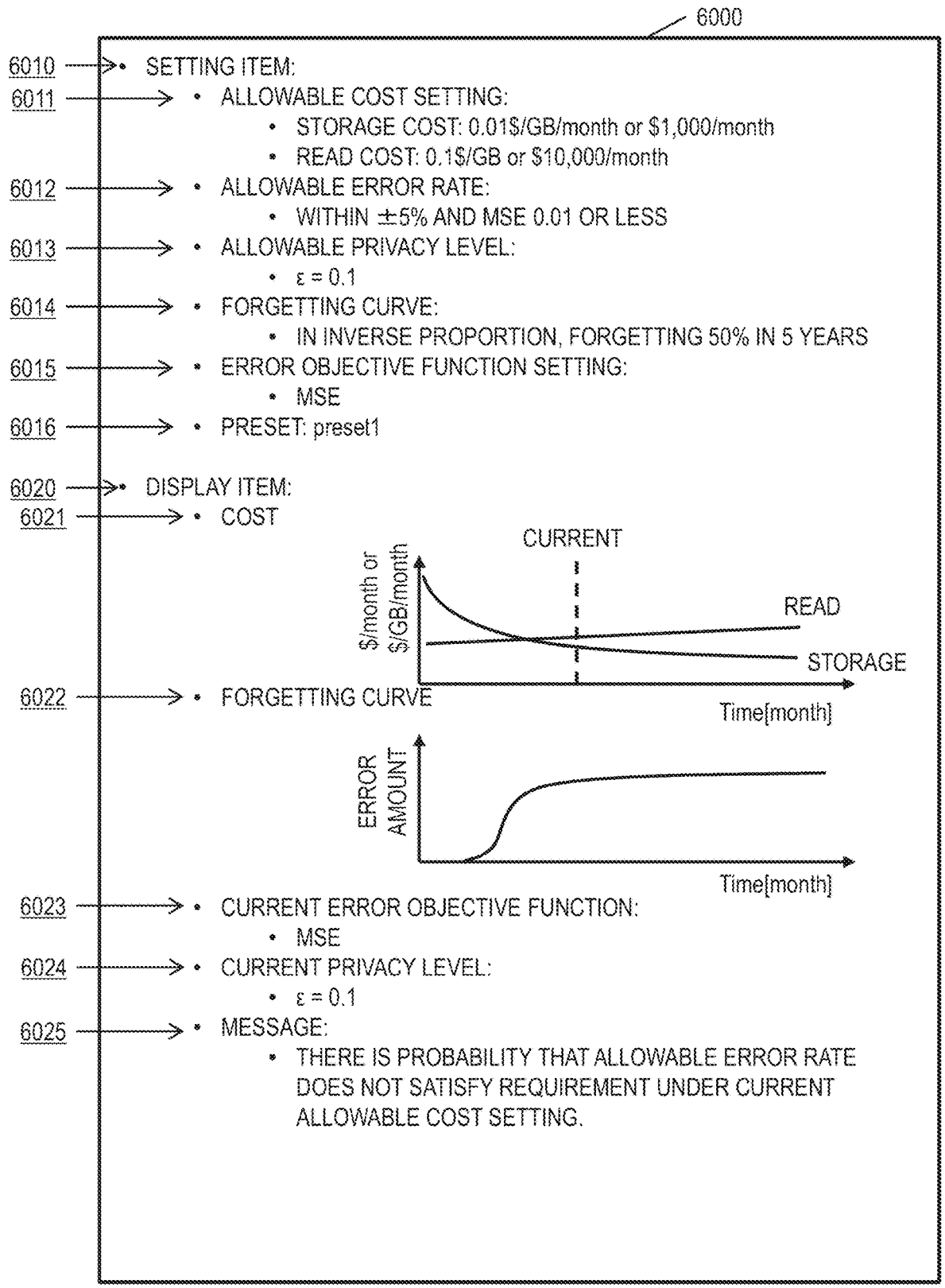

- 6010 → SETTING ITEM:
- 6011 →   • ALLOWABLE COST SETTING:
    - STORAGE COST: 0.01$/GB/month or $1,000/month
    - READ COST: 0.1$/GB or $10,000/month
- 6012 →   • ALLOWABLE ERROR RATE:
    - WITHIN ±5% AND MSE 0.01 OR LESS
- 6013 →   • ALLOWABLE PRIVACY LEVEL:
    - ε = 0.1
- 6014 →   • FORGETTING CURVE:
    - IN INVERSE PROPORTION, FORGETTING 50% IN 5 YEARS
- 6015 →   • ERROR OBJECTIVE FUNCTION SETTING:
    - MSE
- 6016 →   • PRESET: preset1

- 6020 → DISPLAY ITEM:
- 6021 →   • COST
- 6022 →   • FORGETTING CURVE
- 6023 →   • CURRENT ERROR OBJECTIVE FUNCTION:
    - MSE
- 6024 →   • CURRENT PRIVACY LEVEL:
    - ε = 0.1
- 6025 →   • MESSAGE:
    - THERE IS PROBABILITY THAT ALLOWABLE ERROR RATE DOES NOT SATISFY REQUIREMENT UNDER CURRENT ALLOWABLE COST SETTING.

FIG. 7
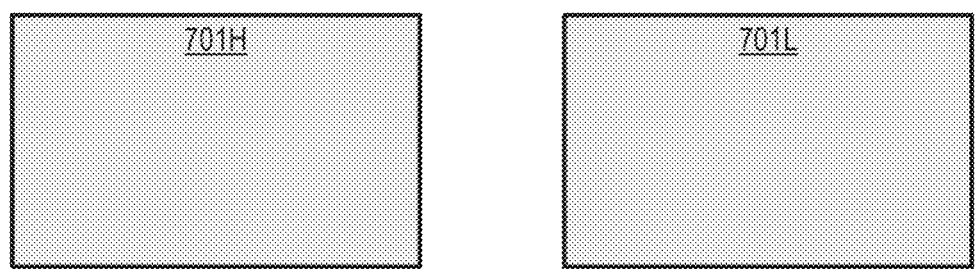
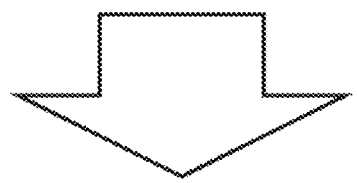
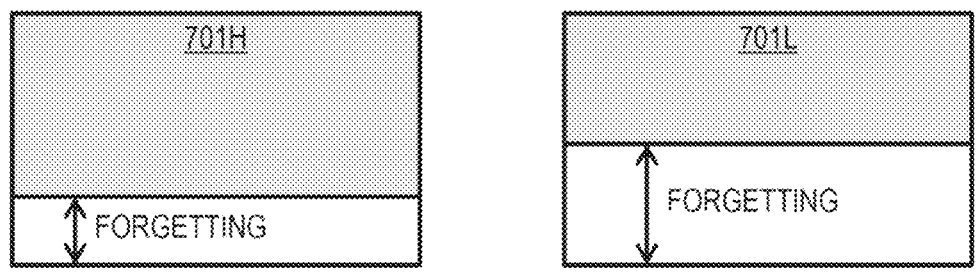

STORAGE SYSTEM AND STORAGE COST OPTIMIZATION METHOD

CROSS-REFERENCE TO RELATED APPLICATION

The present application claims priority from Japanese application JP2019-055662, filed on Mar. 22, 2019, the contents of which is hereby incorporated by reference into this application.

BACKGROUND OF THE INVENTION

1. Field of the Invention

The present invention relates generally to storage control, for example, optimization of storage costs.

2. Description of the Related Art

As a technique related to determination of storage cost, for example, JP-A-2002-312689 discloses a technique.

Although expectations for the Internet of things (IoT) have been increasing for improvement of industrial productivity, at a time point when data is stored, usefulness of the data is unknown. For this reason, actually in many cases, a company needs to store a large amount of data, which is referred to as dark data and whose value is unclear, to a storage device in an initial stage of the IoT. In general, the type of a storage system includes an on-premise type and a cloud type. For both types, as the storage amount (amount of stored data) increases, the data storage cost increases. The amount of data collected by the IoT may be an enormous amount to an extent that the data may be referred to as big data. For these reasons, the company needs to invest in enormous data storage costs for data of unclear value. Further, since the storage amount is usually a cumulative amount and increases as long as the data is not deleted, the data storage cost tends to increase with the elapse of time (that is, as the storage period gets longer). Thus, there is an increased cost to contribute to technological development, such as the incentive of the invention, and as a result, the industrial development may be inhibited.

The above-described problems may also occur in fields other than the IoT.

SUMMARY OF THE INVENTION

There is provided a storage system including a storage device, a memory, and a processor configured to control input and output of data to and from the storage device. The processor monitors a storage amount that is at least one of a write amount (a total amount of data received as a write target) and a physical use amount (a total amount of data physically stored in the storage device), and a read amount (a total amount of data that is read), and calculates a fee as a storage cost that is a cost related to use of the storage device in a target period, based on a storage amount and a read amount in the target period in accordance with a monitoring result.

The storage cost for the data can be optimized.

BRIEF DESCRIPTION OF THE DRAWINGS

FIG. 2A illustrates a configuration of a read table.
FIG. 2B illustrates a configuration of a write table.
FIG. 2C illustrates a configuration of a system table.
FIG. 2D illustrates a configuration of a page table.
FIG. 2E illustrates a configuration of a cost table.
FIG. 2F illustrates a configuration of a user setting table.
FIG. 2G illustrates a configuration of a display table.
FIG. 6 illustrates an overview of a user support graphical user interface (GUI).
FIG. 7 schematically illustrates a case where a reduction rate is changed according to a read frequency.

DESCRIPTION OF THE PREFERRED EMBODIMENTS

Figure 1:
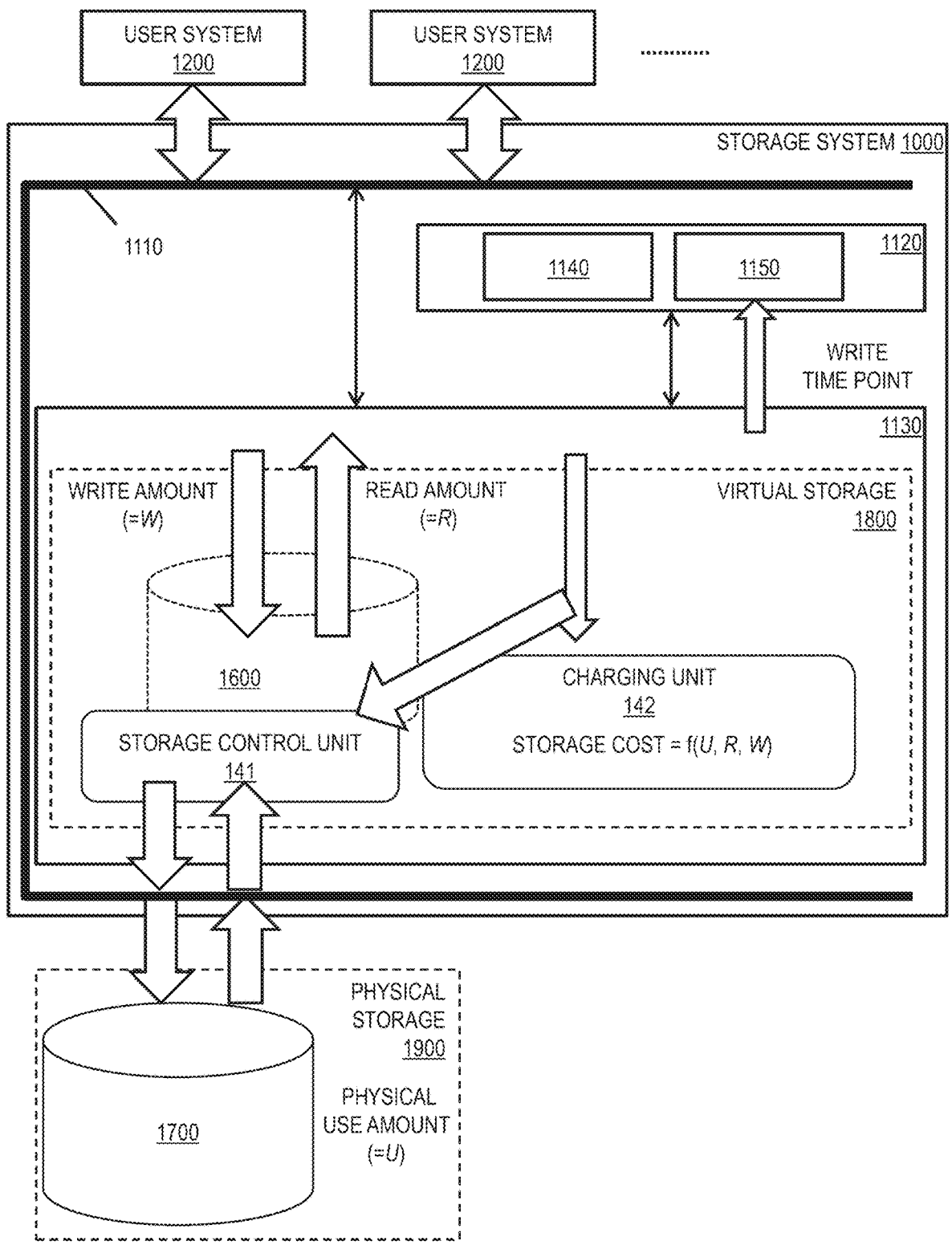
FIG. 1 illustrates an overview of a storage system according to an embodiment.

In the following description, an "interface device" may be one or more interface devices. The one or more interface devices may be at least one of the following.

One or more Input/Output (I/O) interface devices. The Input/Output (I/O) interface device is an interface device for at least one of an I/O device and a remote display computer. The I/O interface device for a display computer may be a communication interface device. At least one I/O device may be a user interface device, for example, an input device such as a keyboard and a pointing device, or an output device such as a display device.

One or more communication interface devices. One or more communication interface devices may be one or more communication interface devices (for example, one or more network interface cards (NIC)) of the same type, or two or more communication interface devices (for example, NIC and host bus adapter (HBA)) of different types.

In the following description, a "memory" may be one or more memory devices, and may be typically a main storage device. At least one memory device of the memory may be a volatile memory device or a non-volatile memory device.

In the following description, a "persistent storage device" is one or more persistent storage devices. The persistent storage device is typically a non-volatile storage device (for example, an auxiliary storage device), and is specifically, for example, a hard disk drive (HDD) or a solid state drive (SSD).

In the following description, a "storage device" may be a physical storage device such as a persistent storage device or a logical storage device associated with a physical storage device.

In the following description, a "processor" is one or more processor devices. At least one processor device is typically a microprocessor device such as a central processing unit (CPU), and alternatively may be another type of processor device such as a graphics processing unit (GPU). At least one processor device may be a single core or a multi-core processor device. At least one processor device may be a processor core. At least one processor may be a processor device in a broad sense such as a hardware circuit (for example, a field-programmable gate array (FPGA) or an application specific integrated circuit (ASIC)) that performs a part or all of processings.

In the following description, an expression "xxx table" may be used to describe information that can be acquired as an output for an input. Alternatively, this information may be data of any structure, or may be a learning model such as a neural network that generates an output for an input. Therefore, the "xxx table" can be referred to as "xxx information". In the following description, the configuration of each table is an example. One table may be divided into two or more tables, and all or a part of two or more tables may be combined into one table.

In the following description, an expression "kkk unit" may be used to describe a function. Alternatively, the function may be implemented by a processor executing one or more computer programs, or implemented by one or more hardware circuits (for example, an FPGA or an ASIC). When the function is implemented by the processor executing the program, a predetermined processing is performed by using a storage device and/or an interface device as appropriate, so that the function may be at least a part of the processor. The processing described using the function as a subject may be a processing performed by a processor or by a device including the processor. The program may be installed from a program source. The program source may be, for example, a recording medium (for example, a non-transitory recording medium) readable by a program distribution computer or a computer. The description of each function is an example, and a plurality of functions may be combined into one function, or one function may be divided into a plurality of functions.

In the following description, a "storage system" may be an on-premise type storage system, a cloud type storage system, or one or both of an edge system (for example, a system that collects data from a plurality of sensors) and a core system (for example, a system that receives data, which is collected from a plurality of sensors, from an edge system) in the IoT.

In the following description, a "physical storage" refers to a device as an entity or service that provides a physical space of a physical storage device. For example, when the type of the storage system is an on-premises type, the physical storage may be a device including a persistent storage device such as an SSD or an HDD, or may be a device including one or more persistent storage devices. Further, for example, when the type of the storage system is a cloud type, the physical storage may be a storage service.

In the following description, a "virtual storage" refers to a virtualized storage that provides a logical space of a logical storage device and that constitutes a storage system using a physical storage. For example, the virtual storage may be a database such as TimeSeriesDB, RDB, or NoSQL that conceptually provides a logical space composed of a set of logical pages to be described below, or may be a block storage, a file storage, or an object storage.

In the following description, a "computing resource" refers to a general term of one or more execution subjects (for example, a processor and a memory) of a processing for configuring a virtual storage from a physical storage. For a cloud type storage system, for example, the computing resource may correspond to instances.

In the following description, a "logical space" refers to a storage space provided by a virtual storage that is an example of the logical storage device, and is, for example, a logical address space. The logical space may be configured with a plurality of logical pages. A "logical page" is a part of the logical space.

In the following description, a "physical space" refers to a storage space provided by a physical storage. The physical space may be configured with a plurality of physical pages. A "physical page" is a part of the physical space. For each physical page, information such as data, a data model that is a representation form of the data, and an error that is a difference between the data and data generated by the data model may be managed by a table. The physical page may be mapped relative to the logical page. Mapping between the logical page and the physical page may be any of 1:1, 1:M, N:1 and N:M (N and M are integers equal to or greater than 2).

Hereinafter, an embodiment of the invention will be described.

FIG. 1 illustrates an overview of a storage system according to the embodiment.

According to a result of intensive studies on data storage cost by the inventor of the present application, it is technically difficult to identify, for write target data, a data value and a reducible data amount using a method such as compression at an initial time point when the data is stored.

Therefore, in the present embodiment, there is provided a storage system 1000 including a logical storage device 1600 (an example of a storage device), a memory 1120, and a processor 1130 configured to control input and output of data to and from the logical storage device 1600. The processor 1130 monitors a storage amount that is at least one of a write amount (a total amount of data received as a write target) and a physical use amount (a total amount of data physically stored in the logical storage device 1600), and a read amount (a total amount of data that is read), and calculates a fee as a storage cost related to use of the logical storage device 1600 in a target period, based on a storage amount and a read amount in the target period in accordance with a monitoring result. According to the monitoring, for example, if the time elapses from a write time point of data (the write time point may be recorded in the memory 1120) to the target period (for example, a start or an end of the target period), at least one of the data value and the reducible data amount can be evaluated or identified. For example, the data value may be evaluated according to the read amount of the data. The reducible data amount of the data may be identified based on a compression rate or the like of the data. Accordingly, the storage cost (fee) in the target period can be optimized.

The "write time point" may be a time point when a predetermined action related to write is performed, and specifically, may be, for example, a time point when a write request is received, a time point when write target data satisfying the write request is stored in the memory 1120 (for example, a cache area), or a time point when the write target data is stored in a physical storage 1900 (physical storage device 1700) as it is (or after being compressed).

The "target period" may be any one of a plurality of periods. Specifically, for example, in a case where charging is on a monthly basis and a fee for October is calculated, a plurality of months is an example of the plurality of periods, October is an example of the target period, and a month before October is an example of a period before the target period.

The storage system 1000 receives an I/O (Input/Output) request from a plurality of (or one) user system(s) 1200, and performs data input/output in response to the I/O request. Each user system 1200 may be a physical or virtual computer used by a user, and may issue an I/O request to a virtual storage 1800 in order to input and output data to and from the logical storage 1600.

The storage system 1000 includes an interface device 1110, the memory 1120, and the processor 1130 connected to the interface device 1110 and the memory 1120.

The interface device 1110 communicates with each user system 1200 and the physical storage 1900.

The memory 1120 stores a program group (a plurality of programs) 1140 and a table group (a plurality of tables) 1150.

The processor 1130 executes the program group 1140, and refers to and updates the table group 1150 in execution of the program group 1140. The virtual storage 1800 that provides the logical storage device 1600 (logical space) is implemented by the processor 1130 executing at least one program of the program group 1140. The virtual storage 1800 includes a storage control unit 141 that performs input and output of data to and from the logical storage device 1600 in response to an I/O request (write request or read request) received via the interface device 1110, and a charging unit 142 that determines a storage cost (fee) related to use of the logical storage device 1600. For example, when a physical page has not yet been allocated to a logical page of a write destination, the storage control unit 141 allocates a free physical page to the logical page. Input and output of data to and from a logical page is actually performed on a physical page that is allocated to the logical page.

The storage system 1000 constitutes the virtual storage 1800 based on the physical storage 1900. As described above, the storage system 1000 may be an on-premise type storage system, a cloud type storage system, or may be, for example, one or both of an edge system and a core system in the IoT. When one or both of the edge system and the core system in the IoT are adopted, the edge system includes a physical storage for temporarily storing data and the core system includes a physical storage having a capacity larger than that of the physical storage of the edge system, so that improvement of efficiency can be expected, including transfer of data from the edge system to the core system. The physical storage device 1700 of the physical storage 1900 may be one or more persistent storage devices, and the physical space may be a storage space (for example, a volume) based on one or more persistent storage devices. The logical storage device 1600 may be the virtual storage 1800 itself, and the logical space may be a storage space having a capacity same as or different from that of the physical space.

The storage control unit 141 monitors a write amount (and write time point), a read amount, and a physical use amount of each user with respect to use of the logical storage device 1600 of the virtual storage 1800. The "write amount" is a total amount of data (total data size) received as a write target. The "physical use amount" is a total amount of data physically stored in the logical storage device 1600, that is, a total amount of data stored in the physical storage device 1700. At least one of the write amount and the physical use amount can be collectively referred to as the "storage amount" as described above. When a data amount reduction processing is performed on certain data, typically, the physical use amount of the data is smaller than the write amount thereof. Examples of the data amount reduction processing include a compression processing and a deduplication processing. In the present embodiment, the compression processing is adopted. As the compression processing, at least one of a lossless compression processing and a lossy compression processing may be performed (both can be performed in the present embodiment).

Hereinafter, in the present embodiment, the storage system 1000 is taken as a cloud type storage system. Therefore, it is assumed that the user is charged by a business operator (hereinafter, referred to as a storage business operator) that provides the virtual storage 1800, and the storage business operator is charged by a business operator (hereinafter, referred to as a cloud business operator) that provides the physical storage 1900. The amount of money that the cloud business operator charges (requests) the storage business operator is an amount of money (an amount of money that increases as a total physical use amount increases, on a basis of an amount of money per unit amount) that tends to increase as a total physical use amount increases, which is a sum of a plurality of physical use amounts corresponding to a plurality of users. Meanwhile, in the present embodiment, the amount of money that the cloud business operator charges (requests) the plurality of users is an amount of money that does not necessarily increase as the storage amount increases (rather, an amount of money that tends not to be a large amount of money (for example, tends to be smaller) in proportion to an increase amount of the storage amount as an elapsed time gets longer). According to the technique in the present embodiment, it is possible to technically realize that profitability of the storage business operator is maintained while a reasonable amount of money is charged on the user.

The charging unit 142 calculates the fee related to use of the logical storage device 1600 in the target period for each user, based on the storage amount and the read amount.

Here, the calculated fee may depend on an elapsed time (an example of a data requirement) from a write time point of the data to the target period. For example, with respect to the fee in the target period, as the elapsed time gets longer, the charging unit 142 may reduce a logical storage cost. There is a tendency that as the logical storage cost is reduced, the storage cost is reduced as to be described below. This corresponds to a fact that the data value indicated by the read amount increases as the elapsed time gets longer, and the value is technically reflected in the logical storage cost. The "logical storage cost" corresponds to an amount of money per unit capacity of the logical storage device 1600 (in other words, an amount of money per unit amount of the write amount). The amount of money charged on the user may be determined based on the logical storage cost. Meanwhile, there is a physical storage cost with respect to the logical storage cost. The "physical storage cost" corresponds to an amount of money per unit capacity of the physical storage device 1700 (in other words, an amount of money per unit amount of the physical use amount). The amount of money that the cloud business operator charges may be determined based on the physical storage cost.

As described above, the charging unit 142 calculates the fee in the target period based on the read amount. That is, in the present embodiment, a technical problem that it is technically difficult to identify the data value at the initial time point when data is stored, is considered in view of a technical characteristic that data required for some processing such as data analysis is read. The data read after being stored is regarded as valuable data and taken as a charging target, and the amount of money collected from the charging target is reflected on the storage cost (for example, based on the collected amount of money (or an amount of money determined based on the collected amount of money), an amount of money to be subtracted from the amount of money according to the storage amount is determined). Accordingly, it is possible to technically realize that the calculated storage cost is smaller than the storage cost determined based only on the storage amount. The determination of the storage cost in the target period is not limited to being based on the read amount in the target period, or may be based on at least the storage amount among the storage amount and data requirements. Accordingly, even if only data that is not read is stored, it can be expected that the profitability of the storage business operator is technically maintained.

The logical storage cost tends to decrease as the elapsed time from the write time gets longer, and as a result, the storage cost tends not to increase (for example, tends to decrease) in proportion to a fee corresponding to the storage amount, which may be adopted. Specifically, for example, the logical storage cost tends to decrease as the read amount increases, and as a result, the storage cost tends not to be a large amount of money (for example, tends to be smaller) in proportion to the fee corresponding to the storage amount, which may be adopted.

Further, for example, by using methods such as one in which the physical storage cost is set to a small amount of money and the read cost is set to a large amount of money, the fee according to the storage amount tends to be used as a cut-price and an amount of money corresponding to the read amount is added, which may be adopted. Further, in this case, in order to avoid a problem that the amount of money to be charged increases as the read amount increases, the charging unit 142 may subtract an amount of money (for example, an amount of money that has been charged in the past) corresponding to a read amount in a period before the target period from the storage cost.

The storage amount may be at least the physical use amount among the write amount and the physical use amount. In this case, the physical use amount decreases in proportion to the write amount as a data amount reduction effect increases (as an amount of data stored in the physical storage device 1700 is greatly reduced), and as a result, it is possible to realize that the storage cost tends not to be a large amount of money (for example, tends to be smaller) in proportion to a fee corresponding to the write amount.

In addition, in consideration of a fact that generally there are a plurality of users of the storage system 1000, the total physical use amount, the physical storage cost, and the read cost are common to a plurality of users of the virtual storage 1800, and the charging unit 142 may calculate a fee to be charged on each user in the target period, based on a data amount reduction rate of data taken as a write target for the user. Accordingly, even if a specific user writes data (for example, data with high entropy that cannot be compressed, or non-overlapping data) with a low reduction rate, it is possible to avoid influencing the fee for storing data of other users.

Hereinafter, the present embodiment will be described in detail.

FIG. 2A to 2G illustrate configurations of examples of tables included in the table group 1150.

Specifically, FIG. 2A illustrates a configuration of a read table 1141. The read table 1141 has a record for the virtual storage 1800 and the physical storage 1900 for each user. With respect to the virtual storage 1800, for each user, a record corresponding to the user stores information indicating, for example, a user ID, a logical read amount in a latest period, and a logical read amount in each past period before the latest period. With respect to the physical storage 1900, for each user, a record corresponding to the user stores information indicating a user ID, a physical read amount in a latest period, and a physical read amount in each past period before the latest period. In the each period, any of the logical read amount and the physical read amount used herein may be a read amount (increased amount) increased in the period, or may be a cumulative read amount (a cumulative value of the read amount) up to the period. The "logical read amount" is an amount of data read from the logical storage device 1600, and the "physical read amount" is an amount of data (for example, uncompressed or compressed data) read from the physical storage device 1700. For each of the virtual storage 1800 and the physical storage 1900, a time-series read amount can be identified for each user based on the read amount in each past period before the latest period.

FIG. 2B illustrates a configuration of a write table 1142. The write table 1142 has a record for each of the virtual storage 1800 and the physical storage 1900 for each user. With respect to the virtual storage 1800, for each user, a record corresponding to the user stores information indicating, for example, a user ID, a write amount in the latest period, and a write amount in each past period before the latest period. With respect to the physical storage 1900, for each user, a record corresponding to the user stores information indicating, for example, a user ID, a physical use amount in the latest period, and a physical use amount in each past period before the latest period. In the each period, any of the write amount and the physical use amount may be a cumulative value. In addition, for any of the write amount and the physical use amount, when update data in an amount A same as an amount A of written data is written, A may be added to the cumulative value or may not be added thereto. For the virtual storage 1800, a time-series write amount can be identified for each user based on the write amount in each past period before the latest period. Similarly, for the physical storage 1900, a time-series physical use amount can be identified for each user based on the physical use amount in each past period before the latest period.

FIG. 2C illustrates a configuration of a system table 1143. The system table 1143 has a record for each of the virtual storage 1800 and the physical storage 1900 for each user. A record corresponding to the virtual storage 1800 stores virtual storage information (information indicating a configuration of the virtual storage 1800). A record corresponding to the physical storage 1900 stores physical storage information (information indicating a configuration of the physical storage 1900). The virtual storage configuration information may include, for example, an ID of each of one or more virtual storages 1800 present in the storage system 1000. The physical storage configuration information may also include an ID for each of one or more physical storages 1900 connected to the storage system 1000. That is, one example of a storage device may be one or more virtual storages 1800 (one or more logical storage devices 1600), and at least one virtual storage 1800 (at least one logical storage device 1600) may be associated with one or more physical storages 1900 (one or more physical storage devices 1700). Further, one virtual storage 1800 may have a plurality of logical storage devices 1600, and similarly, one physical storage 1900 may have a plurality of physical storage devices 1700.

FIG. 2D illustrates a configuration of a page table 1144. The page table 1144 stores a corresponding relationship between a physical space and a logical space, and stores information indicating, for example, a corresponding relationship between a logical page and a physical page. Specifically, for example, the page table 1144 has a record for each logical page. For example, for each logical page, a record corresponding to the logical page stores information indicating a logical page ID (an ID of the logical page), a physical page ID (an ID of a physical page allocated to the logical page), and page-associated details (details associated with the logical page). For each logical page, the page-associated details may include a read frequency, a write frequency, or a compression rate of the logical page.

FIG. 2E illustrates a configuration of a cost table 1145. The cost table 1145 stores information on costs, and stores information indicating, for example, a read cost (for example, a cost per unit amount of a logical read amount), a calculation cost (for example, a cost for compression processing and decompression processing), a physical storage cost, a logical storage cost in the latest period, and a logical storage cost in each past period. Examples of the information indicating the "read cost" may include information indicating a cost per unit amount of a physical read amount (which may be referred to as a physical read cost) in addition to the information indicating the cost per unit amount of the logical read amount (which may be referred to as a logical read cost).

FIG. 2F illustrates a configuration of a user setting table 1146. The user setting table 1146 stores, for each user, information (for example, information indicating at least a part of data requirements) set by the user to the storage system 1000. For example, the user setting table 1146 has a record for each user. For each user, a record corresponding to the user stores information indicating, for example, a user ID, a storage cost condition (for example, a fee per period), a read cost condition (for example, a fee per period), an error rate condition (for example, an allowed error rate), a privacy level condition (for example, an allowed privacy level), a forgetting curve, an error objective function, and a preset. For each user, among the information stored in the record corresponding to the user, information other than the user ID corresponds to at least a part of user requirements. An error rate, a privacy level, the forgetting curve, the error objective function, and the preset will be described below.

FIG. 2G illustrates a configuration of a display table 1147. The display table 1147 stores information for display related to the storage system 1000 for each user. For example, the display table 1147 has a record for each user. For each user, a record corresponding to the user stores information indicating, for example, a user ID, a logical storage cost (for example, a predicted logical storage cost for the latest period, and a logical storage cost in each past period), a read cost (for example, a predicted read cost for the latest time period, and a read cost in each past period), and a current forgetting curve, a current error objective function, and a current privacy level.

Figure 3:
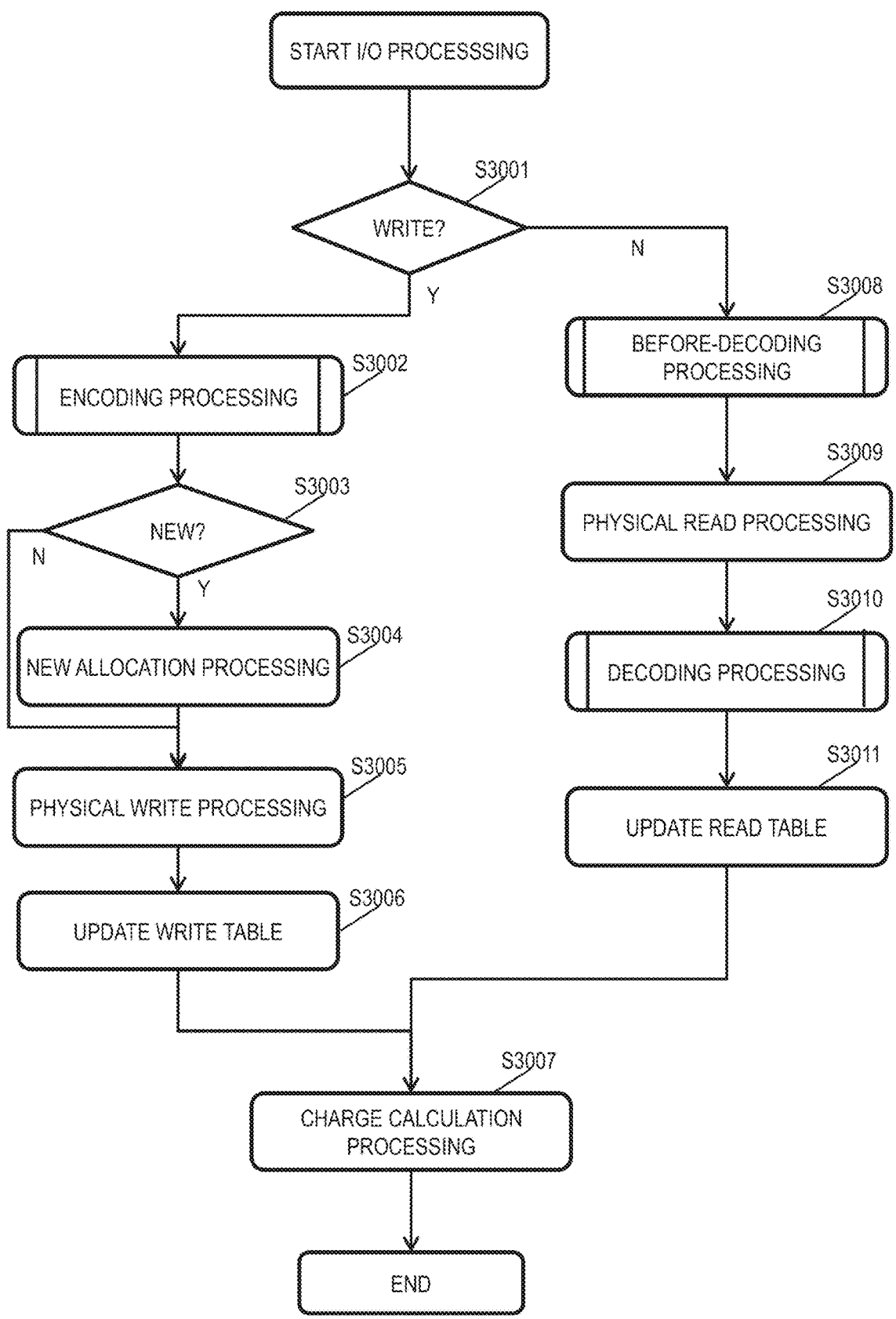
FIG. 3 illustrates a flow of an I/O processing.

FIG. 3 illustrates a flow of an I/O processing.

When the storage system 1000 receives an I/O request (a write request or a read request), the storage control unit 141 determines whether the request is a write request (S3001).

If the determination in S3001 is true (S3001: Y), the storage control unit 141 performs an encoding processing (for example, a compression processing) on write target data (data satisfying the received write request) (S3002). When the storage control unit 141 identifies that a physical page has not yet been allocated to a write destination logical page specified according to the write request, based on the page table 1144 (S3003: Y), the storage control unit 141 allocates a free physical page to the logical page (updates the page table 1144) (S3004). Thereafter, the storage control unit 141 writes data (for example, the write target data, or encoded (compressed) data of the write target data) to the physical page allocated to the write destination logical page (S3005). Thereafter, the storage control unit 141 updates the write table 1142. Specifically, the storage control unit 141 updates the write amount and the physical use amount in the latest period (for example, adds an addition amount, which is an amount of data calculated with respect to the write amount and newly added this time, to the current write amount or physical use amount) (S3006). The step S3006, that is, updating the write amount or the physical use amount corresponding to the latest period (that is, a period to which a write time point belongs), based on a data amount in accordance with the write of this time for each of the logical storage device 1600 and the physical storage device 1700, may be an example of recording a write time point (of course, the write time point itself may be recorded in a table such as the write table 1142 every time when a write is performed). Next, the charging unit 142 performs a charge calculation processing (S3007). In the charge calculation processing, a charge amount of data in the latest period (an example of the target period) is determined according to an elapsed time from data storage (write time point).

Since a compression rate of the data and a read tendency for the data are not known until the data is written, a fee in the latest period is determined based on the compression rate and the read tendency after the data is written. For example, the charging unit 142 may calculate the charge amount based on the write table 1142, the read table 1141, and the cost table 1145. Specifically, for example, when performing calculation based on past records, the charging unit 142 may calculate a logical storage cost in a certain period (for example, the past one month) in the past using the following equation.

Read amount in past (predetermined period)=$R1$

Storage amount in past (predetermined period)=$U1$

Logical storage cost in past (predetermined period) to be requested (\$/GB/Month)=$(U1*C1-R1*C2)\div U1$ Further, for example, when performing calculation based on a future prediction, the charging unit 142 may calculate a future logical storage cost using the following equation.

Predicted read amount in future (predetermined period)=$R2$

Predicted storage amount in future (predetermined period)=$U2$

Future (predetermined period) logical storage cost to be requested (\$/GB/Month)=$(U2*C1-R2*C2)\div U2$ This future logical storage cost may be displayed and used to visualize a future investment amount. A requested amount of money may be corrected based on this amount of money. For example, when a future read is expected, reducing the amount of money of the storage cost is conceivable. The physical storage cost (C1) (\$/GB/Month) and the read cost (C2) are registered in advance in the cost table 1145.

After S3005 (or after the data satisfying the write request is cached in the memory 1120), the storage control unit 141 transmits write completion, as a response to the write request, to the user system 1200 that is a transmission source of the write request. Caching the data satisfying the write request may correspond to writing data to the write destination logical page specified according to the write request (writing data to the logical storage device 1600), and writing the cached data to the actual physical storage 1900 may correspond to writing the data to the write destination logical page and writing the data to the physical page allocated to the logical page (writing the data to the physical storage device 1700).

If the determination in S3001 is false (S3001: N), that is, when the received I/O request is a read request, the storage control unit 141 performs a before-decoding processing (S3008). The before-decoding processing is for determining a read source physical page. Thereafter, the storage control unit 141 reads data from the read source physical page (S3009), and performs a decoding processing if the read data is encoded data (S3010). Thereafter, the storage control unit 141 updates the read table. Specifically, the storage control unit 141 updates the logical read amount and the physical read amount in the latest period (for example, adds a read addition amount, which is an amount of data read this time and calculated with respect to the read amount, to the current logical read amount or physical read amount) (S3011). Thereafter, the charging unit 142 performs the charge calculation processing (S3007). The data after decoding (or the data read from the physical page since there is no encoded data), as a response to the read request, is transmitted by the storage control unit 141 to the user system 1200 that is a transmission source of the read request. Reading and caching data from the physical page corresponds to reading data from the physical storage device 1700, and may be a processing included in a physical read processing (S3009). Returning the cached data (and the data to which the decoding process is performed as needed) as a response to the read request may correspond to reading the data from the logical storage device 1600.

The compression processing or the charge calculation processing (S3007) may be asynchronous with the processing performed in response to the I/O request. For example, when a certain amount of data is cached, the compression processing may be performed on the certain amount of data.

Details of the encoding processing (S3002), the before-decoding processing (S3008), and the decoding processing (S3010) in the I/O processing illustrated in FIG. 3 are different depending on a case whether the compression processing is a lossless compression processing or a lossy compression processing.

Figure 4A:
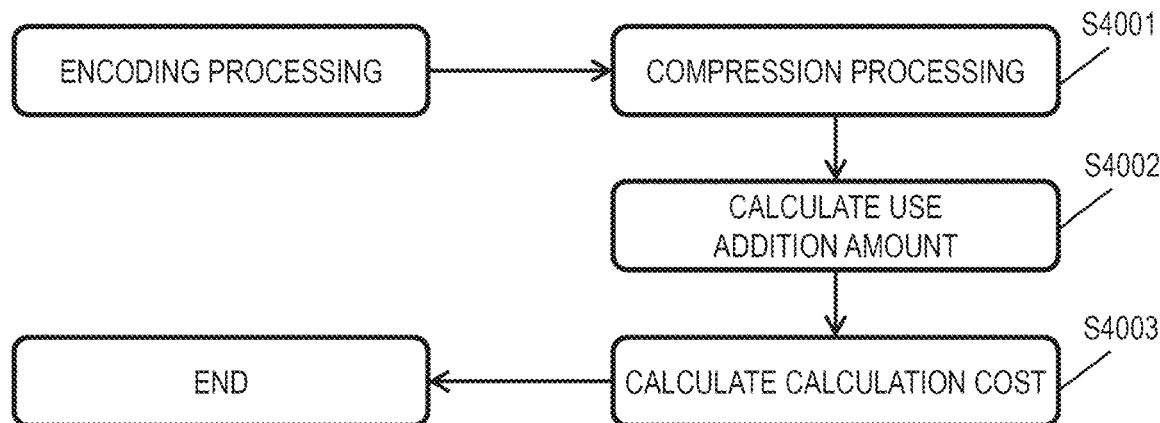
FIG. 4A illustrates a flow of an encoding processing related to a lossless compression processing.
Figure 4B:
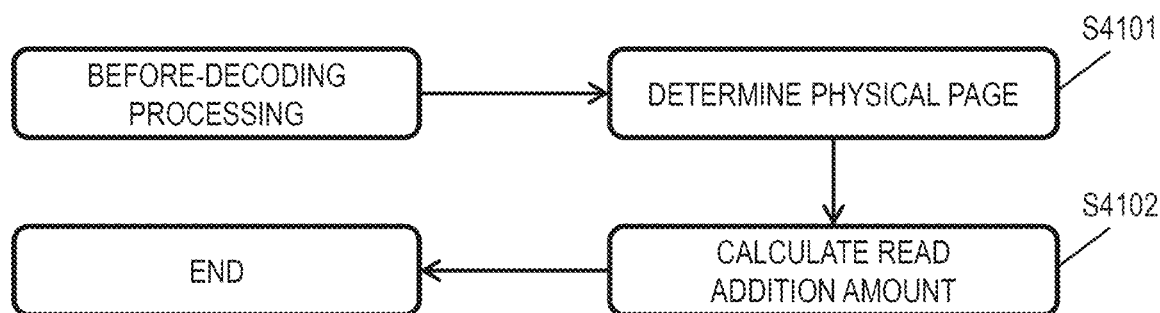
FIG. 4B illustrates a flow of a before-decoding processing related to the lossless compression processing.
Figure 4C:
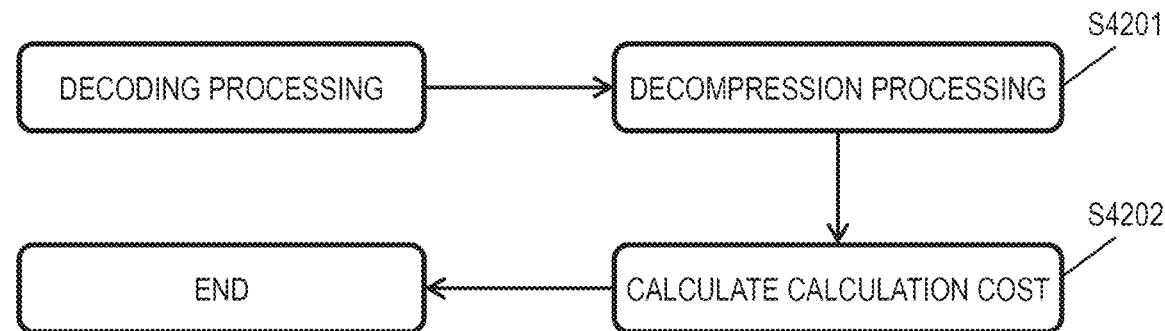
FIG. 4C illustrates a flow of a decoding processing related to the lossless compression processing.

FIG. 4A illustrates a flow of the encoding processing related to the lossless compression processing. FIG. 4B illustrates a flow of the before-decoding processing related to the lossless compression processing. FIG. 4C illustrates a flow of the decoding processing related to the lossless compression processing.

As illustrated in FIG. 4A, when the encoding processing is started, the storage control unit 141 performs a compression processing on the write target data (S4001). The storage control unit 141 performs lossless compression on the data using, for example, a deflate algorithm. In a case of a column type database, compression may be performed on one or more columns including the data. Further, a lossless compression method using machine learning, or the like may be applied. Thereafter, the storage control unit 141 calculates a use addition amount, which is an amount to be added to a physical use capacity, in accordance with a data amount after compression (S4002). Specifically, for example, the storage control unit 141 calculates a product of the number of physical pages to be updated or newly written and a size of the physical page, as the use addition amount. The use addition amount calculated in S4002 is added to the current physical use amount in S3006 of FIG. 3. Thereafter, the storage control unit 141 calculates a calculation cost (for example, a cost of calculation resources) required for the compression processing in S4001, based on calculation cost information in the cost table 1145 (S4003). For example, use time of cloud instance required for the compression processing×fee per unit time may be the calculation cost calculated in S4003. This calculation cost may be, for example, an element included in the data requirement illustrated in FIG. 1, and thus may be used to calculate an appropriate storage cost.

As illustrated in FIG. 4B, when the before-decoding processing is started, the storage control unit 141 refers to the page table 1144, and identifies a read source physical page allocated to a read source logical page specified according to the read request (S4101). Next, the storage control unit 141 calculates a read addition amount that is an amount to be added to a current physical read amount, which is an amount according to the number of the specified read source physical pages and a size of the physical page (S4102). The read addition amount calculated in S4102 may be added to the current physical read amount in S3011 of FIG. 3. In S4102, an amount to be added to a current logical read amount is calculated, which is an amount according to the number of read source logical pages and a size of the logical page, and the amount may be added to the current logical read amount in S3011 of FIG. 3.

As illustrated in FIG. 4C, when the decoding processing is started (that is, when the data read from the physical storage is encoded data), the storage control unit 141 performs a decompression processing on the data (S4201). This decompression processing is a processing corresponding to the compression processing performed in S4001. Thereafter, the storage control unit 141 calculates a calculation cost required for the decompression processing similarly to calculating the calculation cost required for the encoding (S4202).

Figure 5A:
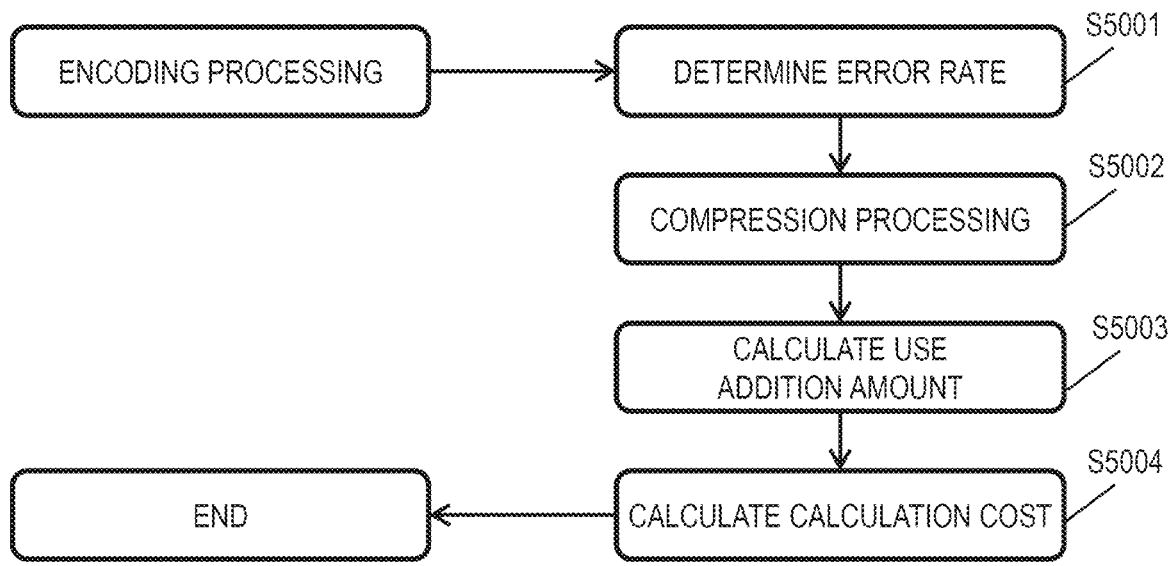
FIG. 5A illustrates a flow of an encoding processing related to a lossy compression processing.
Figure 5B:
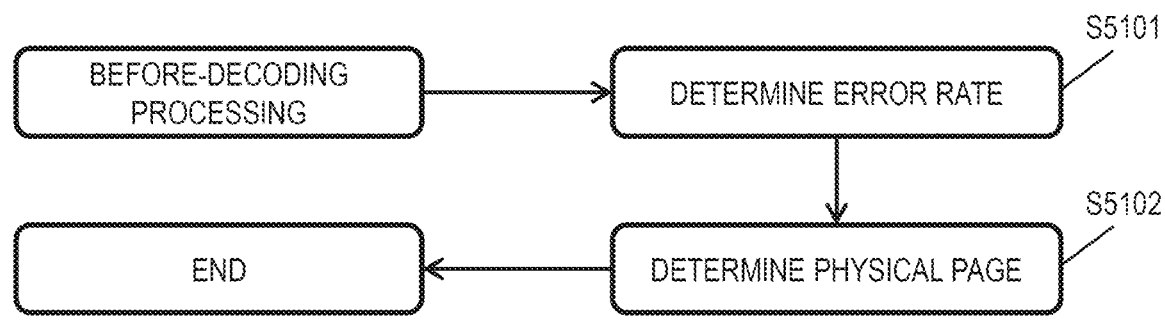
FIG. 5B illustrates a flow of a before-decoding processing related to the lossy compression processing.
Figure 5C:
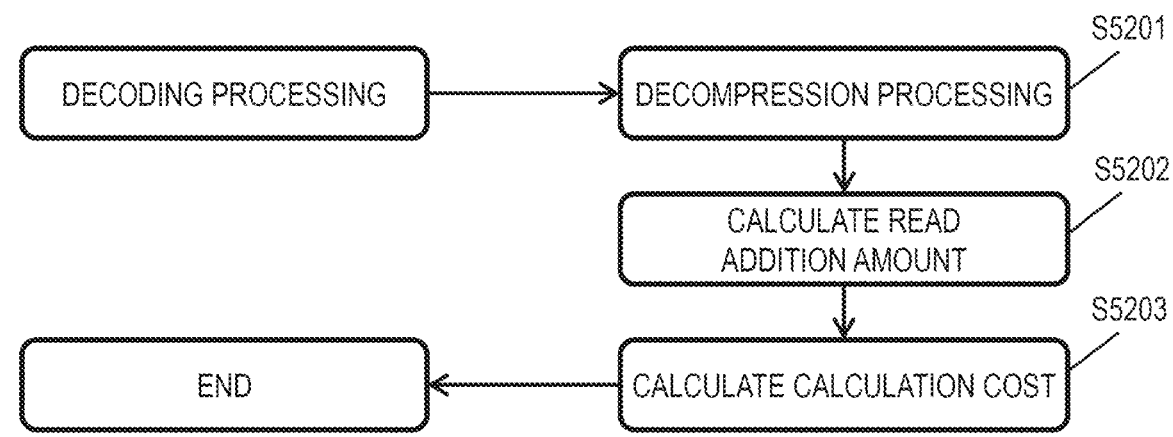
FIG. 5C illustrates a flow of a decoding processing related to the lossy compression processing.

FIG. 5A illustrates a flow of an encoding processing related to a lossy compression processing. FIG. 5B illustrates a flow of a before-decoding processing related to the lossy compression processing. FIG. 5C illustrates a flow of a decoding processing related to the lossy compression processing. In a case of lossy compression, the storage control unit 141 can significantly reduce an amount of data seldom read (for example, data stored in a logical page having a relatively low read frequency (for example, equal to less than a threshold) at a high error rate using statistical estimation or the like, and thus an appropriate storage cost can be maintained. Further, in a read processing in accordance with a read request, the storage control unit 141 can reduce an amount of data to be read in the decoding processing, in accordance with the error rate condition included in data requirements, and thus an appropriate storage cost can be maintained.

Hereinafter, differences of FIGS. 5A to 5C from FIGS. 4A to 4C will be mainly described.

According to FIG. 5A, a lossy encoding processing is performed with an input of a data requirement of at least one of the following four points:

error objective function;
error rate;
privacy level; and
expected future read amount. The data requirement may be input and set by the user via a user support GUI to be described below, or may be calculated and set by the storage control unit 141. The "error rate" is an error rate of data obtained by decompression to target data, and the "error objective function" is a requirement corresponding to an indicator of a prediction error such as a mean squared error and influencing the error rate. The "privacy level" is an intensity of noise applied to at least a part of the data.

The storage control unit 141 performs error rate determination (S5001), and thereafter performs a compression processing (data amount reduction) within a range of the error rate determined in S5001 (S5002). Thereafter, processings similar to those of S4002 and S4003 are performed (S5003 and S5004).

Specifically, for example, in the encoding processing illustrated in FIG. 5A, at least one of the following may be performed.

When creating a generation model of write target data (this is referred to as encoding) using a machine learning method, the storage control unit 141 sets a loss function as an error objective function, and, when the error rate reaches an error rate as an input data requirement, stops learning in the generation model, or stores vector data of difference (referred to as error data) and the generation model so as to satisfy the error rate at the time of learning limit. As a method of machine learning, in addition to a neural network, a method such as sparse coding (for example, k-SVD), or any other commonly known method may be used. The error objective function may be determined based on a preset that is based on a use case or the like, or may be derived as an optimal function, which satisfies a key performance indicator (KPI) of a user, using a method such as reinforcement learning from use of an analysis application or the like.

The storage control unit 141 adds noise, which corresponds to the Laplace distribution and is at an intensity corresponding to the privacy level set as the data requirement, to the write target data. Here, since noise is eventually added, the storage control unit 141 may increase an error rate of learning in accordance with a noise level (the privacy level set as the data requirement), and store the data having a smaller amount into the physical page. A method such as a commonly known differential privacy may be applied to the write target data, or the write target data may be statistically processed in accordance with a target data range (for example, data of a designated number of users).

The storage control unit 141 may infer the expected future read amount set as the data requirement based on the read frequency (read frequency for each logical page) indicated by the page table 1144, or based on freshness of the data (for example, the elapsed time from the write time point). The storage control unit 141 may determine the error rate based on the expected future read amount set as the data requirement. For example, for data that is highly likely not to be read at all, a high error rate is set, so that the storage cost can be effectively reduced.

According to FIG. 5B, in the lossy before-decoding processing, the storage control unit 141 performs error rate determination (S5101). Thereafter, a processing similar to that of S4101 is performed (S5102).

According to FIG. 5C, in the lossy before-decoding processing, the storage control unit 141 performs a decompression processing using, for example, the generation model described above (S5201), calculates a read addition amount (S5202), and performs a processing similar to that of S4202 (S5203).

As described above, data predicted to be less needed can be efficiently reduced, and the storage cost can be further optimized. For example, the charging unit 142 can determine a storage cost for each user according to a data compression rate of each user, and accordingly the user can determine an appropriate storage cost. For example, even when uncompressed data with high entropy is written by a specific user, it is possible to prevent a physical use amount of a relatively low reduction rate of the user from influencing the storage cost of another user.

FIG. 6 illustrates an overview of the user support GUI. A user support GUI 6000 is a GUI that is for supporting a user with respect to optimization of the storage cost. Information displayed on the user support GUI 6000 is in accordance with the information stored in the record corresponding to a corresponding user in the display table 1147. Items displayed on the user support GUI 6000 are mainly classified into a setting item 6010 and a display item 6020.

The setting item 6010 may include a UI such as an allowable cost setting 6011, an allowable error rate 6012, an allowable privacy level 6013, a forgetting curve 6014, an error objective function setting 6015, and a preset 6016.

The allowable cost setting 6011 is a user interface (UI) for setting a cost that can be allowed by the user. According to an example of FIG. 6, "0.01$/GB/month or 1,000$/month" is set as a storage cost in the allowable cost setting 6011. "0.01$/GB/month" is an example of a logical storage cost, and means 0.01$ per GB per month or less. "1,000$/month" is an example of a cost based on a logical storage cost and a storage amount, and means a total of 1000$ per month or less. "0.1$/GB or 10,000$/month" is set as a read cost. "0.1$/GB" is an example of a fee per unit amount of a read amount, and means 0.1$ per GB or less. "10,000$/month" is an example of a cost based on the fee per unit amount of a read amount and on a read amount, and means a total of 10,000$ per month or less.

The allowable error rate 6012 is a UI for setting a data error rate (error rate condition) that can be allowed by the user.

The allowable privacy level 6013 is a UI for setting a privacy level that can be allowed by the user. As described above, the privacy level is an intensity (level) of noise given to original data, and may be, for example, a noise level at the time when identifying an individual based on the original data is made difficult.

The forgetting curve 6014 is a UI for setting a forgetting curve (for example, a relationship between lapse of time and an error amount) desired by the user.

The error objective function setting 6015 is a UI for setting an error indicator used for, for example, a loss function learned by a generation model. Here, for example, indicators such as a mean squared error (MSE), KL divergence, ±10% (ratio), and ±10 (difference) may be set explicitly depending on the user s data and usage. The storage control unit 141 may statistically derive an error objective function based on data characteristics of the user and an access pattern to data.

The preset 6016 is a UI for setting a preset (for example, a name) that is information indicating association between a package of setting values of the setting items 6011 to 6015 and types of application. When the preset is selected, a plurality of setting values included in a setting value group associated with the preset are automatically set for a plurality of setting items.

At least one of the setting items 6011 to 6016 may be automatically calculated and set by the storage system 1000 instead of being set by the user.

Next, the display item 6020 may include, for example, a UI such as 6021, another forgetting curve 6022, a cost 6021, a current error objective function 6023, a current privacy level 6024, and a message 6025.

As illustrated, the cost 6021 displays, in a graph, a relationship between the storage cost and lapse of time, which includes time till now and time in the future (prediction). A total predicted amount of money may be calculated by calculating the storage cost, based on the read amount, the storage time point, the compression rate, the allowable error rate, the forgetting curve, and the like of each data. With this graph, the user can know a prediction of the fee corresponding to characteristics of his/her own data and access.

The forgetting curve 6022 displays a forgetting curve, which is calculated by the charging unit 142 based on a forgetting curve requirement set by the user and on a current state of the storage system 1000. For example, as illustrated, the forgetting curve may be displayed, with a vertical axis being the error amount and a horizontal axis being lapse of time.

The current error objective function 6023 displays an error objective function, which is calculated by the charging unit 142 based on a setting value of the error objective function setting 6015 and on a current state of the storage system 1000. For example, a general name such as a mean squared error (MSE) may be displayed, or a mathematical expression set by the user may be displayed.

The current privacy level 6024 displays a current privacy level, which is calculated by the charging unit 142 based on a setting value of the allowable privacy level 6013 and on a current state of the storage system 1000. For example, parameters (distribution shape, degree, and the like) of the Laplace distribution to be used at the time of adding noise may be displayed.

When it is inferred, based on the setting values of the setting items 6011 to 6015 and on a current state of the storage system, that at least one of the setting items 6011 to 6015 cannot be maintained, the user can be notified of an alert indicating that by the message 6025. Accordingly, the user can consider changing at least one setting value or changing a use policy of the storage system 1000, in order to maintain an appropriate storage cost.

With the GUI 6000 described above, the setting of the data requirement to the storage system 1000, and feedbacks with respect to the setting from the storage system to the user can be realized. The information displayed on the GUI 6000 may be displayed on two or more different screens.

The storage system 1000 for performing at least one of the lossless compression processing and the lossy compression processing may be configured as follows. In the following description, examples of terms are as follows.

Difference information: Information (for example, an array) indicating an error between a generated value from a data model and original data. The difference information is information used with respect to lossless compression, and thus corresponds to an accurate difference value between the generated value from the data model and the original data. The accurate difference value may be symbolically represented in accordance with a minimum unit of a numerical value of the original data (for example, a unit of 1 if the minimum unit is an integer type, a bit representation of a general floating point number if the minimum unit is a decimal point type), and based thereon a difference may be obtained. For efficient compression of the difference information, a compression method, which uses prediction probability distribution such as Context-Adaptive Arithmetic Coding, may be used in combination. Specifically, the data model may be used to predict an occurrence probability of a symbol, and arithmetically encoded data may be stored as a part of the difference information.

Error Information: Information (for example, an array) obtained by quantizing an error between a generated value from a data model and original data. A quantization method may be based on, for example, a log scale or may be based on a linear scale. The error information is information used with respect to lossy compression, and thus is not an accurate difference between the generated value from the data model and the original data. Compression (including a method based on the difference information described above) is likely to be effective.

Data model: Data generation rules, models, and execution subjects.

Data Set: One logical electronic data chunk as viewed from a program such as an application program, which may be, for example, any one of a record, a file, a key-value pair, and a tuple. Elements of a data set group.

Dataset group: One or more data sets corresponding to one model.

Figure 8:
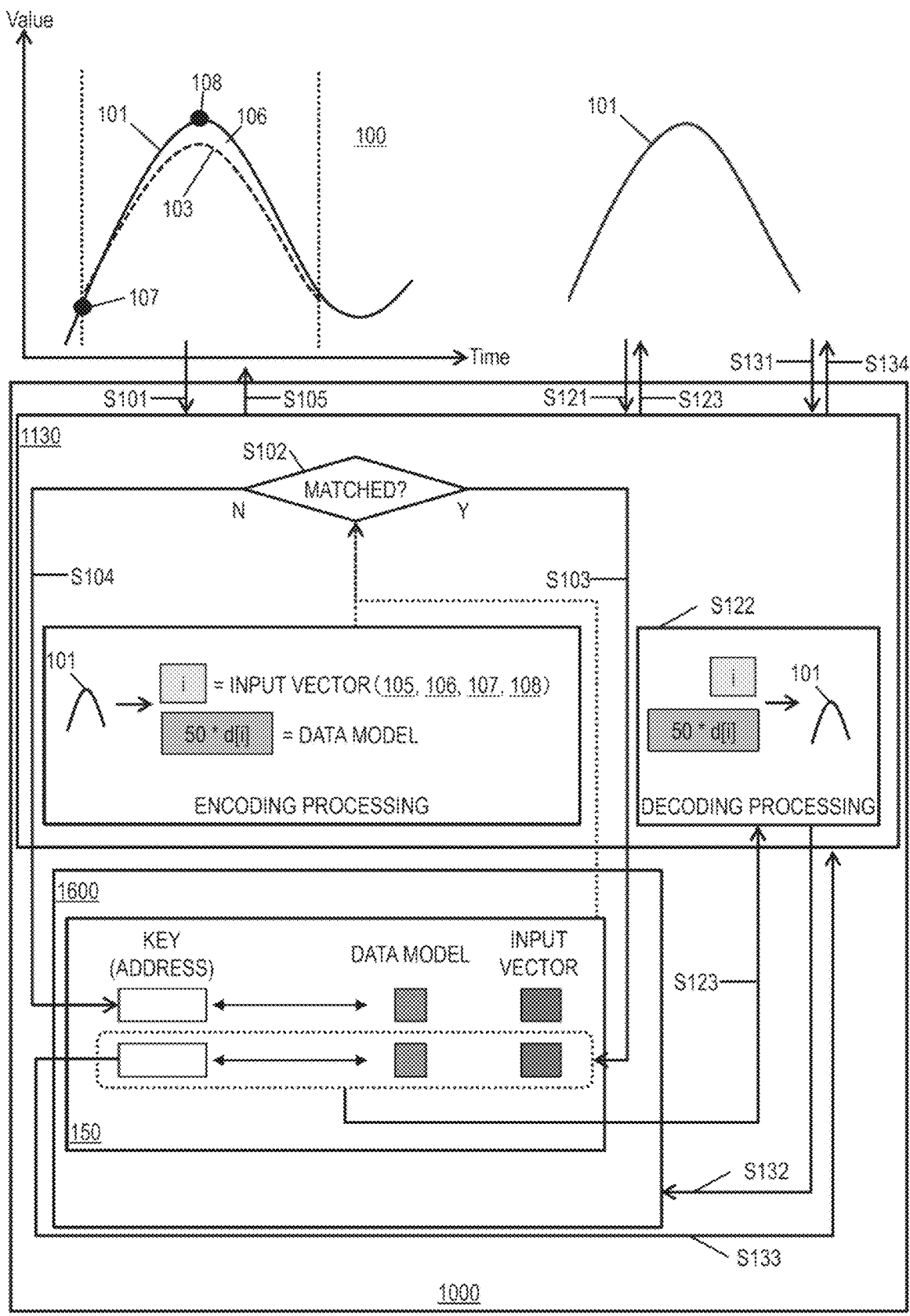
FIG. 8 illustrates an overview of a compression processing of the storage system according to the embodiment.

FIG. 8 illustrates an overview relating to a compression processing of the storage system 1000.

The storage system 1000 converts a write target data set group, which is a write target of a plurality of data sets, into a data model, in which regularity of the write target data set group is shown, one or more input values are input and a data set group is output, and the data model can be made a dictionary in association with a key of the write target data set group. To make the data model a dictionary may correspond to a write of the data set group.

The data model may typically be a binary string that represents regularity of a mathematical expression processing, of a waveform shape, and of probability distribution. An increase amount of a data amount of the data model (and of an input vector to be described below) may be smaller than an increase amount of a data amount of the write target data set group. For this reason, an effect of data amount reduction is expected to be bigger as the data amount of the write target data set group gets larger.

The data model may correspond to an execution subject that processes input data instead of data such as one or more input values. As the data model, for example, a model such as a neural network may be adopted. In general, a model such as a neural network is used for analysis such as calculation of a failure rate and recognition of an image. In the present embodiment, such a model is adopted as an example of a data model indicating regularity of a data set group, and the storage system 1000 may be a new storage system that stores one or more data models (execution subjects) instead of one or more data sets. Note that the data model does not necessarily need an input vector to be described below depending on a type of the model adopted as the data model (for example, when there is one unit of an input layer and determined integer values from 0 to N are used as input values, it is not necessary to store the input vector).

For example, a model dictionary 150 may be stored in the logical storage device 1600. The model dictionary 150 is a dictionary of the data model, and may store a data model and an input vector for each key. The key may include, for example, a write destination address (for example, a logical block address (LBA)).

In the storage system 1000, each portion of time-series data 100 (for example, an array including numerical information, such as time-series data of values measured by a sensor) may be write target data (specifically, a data set group). Hereinafter, in the description of FIG. 8, one data set group 101 is mainly taken as an example. The data set group 101 may be a plurality of data sets belonging to a predetermined data set range (here, a time point range). The "data set" mentioned herein may include a time point (a measurement time point) and a value (a measurement value). When the data set range is x seconds and y data sets constitute the data set group 101, y/x is an input frequency. For example, when x=10 and y=1000, the input frequency is 100 (1000/10) Hz. The data set group 101 may be an array of numerical values in any dimension. For example, in a case of sensor data, the array is of two-dimension of sensor×time frame, in a case of image data, the array is of three-dimension of color space×length×width, and in a case of moving image data, the array is of four-dimension of color space×length×width×time frame.

Hereinafter, an overview of examples of a write processing, a read processing, and a retrieval processing of the data set group 101 will be described.

<Write Processing of Data Set Group 101>

The processor 1130 receives a write request of the data set group 101 from the user system 1200 (S101). The write request is associated with a write destination address. The write target data set group 101 is cached in the memory 1120.

When the write request is received, the processor 1130 retrieves a matching data model, which is a data model having the highest matching degree with the data set group 101, from the model dictionary 150, and performs matching determination by comparing the matching degree with the matching data model with a first threshold (S102).

The matching degree is an indicator indicating a similarity between two target data models, between two data set groups, or between two hash values (rolling hash, fuzzy hash, Locality Sensitive Hash, and the like) generated from the two data set groups. Examples (for example, an example of an indicator for a plurality of values) of the indicator include cosine similarity. In addition, a commonly known method such as a mean squared error or a cross entropy may be used.

For example, the following methods (C1) and (C2) as specific methods of comparing the matching degree are conceivable. The matching determination (and similarity determination to be described below) may include any of the following comparisons (C1) and (C2), but in the present embodiment, the comparison of (C1) is adopted.

(C1) Data model comparison. For example, the processor 1130 performs an encoding processing, which includes a processing of generating a data model of the data set group 101 and a processing of generating an input vector based on the data set group 101. The processor 1130 calculates a matching degree between the generated data model (or a hash value thereof) and each data model (or a hash value thereof) in the model dictionary 150.

(C2) Data set group comparison. For example, the processor 1130, for each data model in the model dictionary 150, may use an input vector associated with the data model to restore a data set group. The processor 1130 calculates a matching degree between the data set group 101 and each restored data set group. Further, as in the case of (C1), the comparison may be performed with hash values (a part or all of an encoding source data set group) calculated in advance, without performing the comparison with the restored data set groups. As a hash method, a method such as a fuzzy hash or a rolling hash may be used.

Specifically, the retrieval processing of the model dictionary 150 may be performed at a high speed by using a commonly known method (such as a hash table). A similar model may be recalled using a Hopfield network or the like.

In the comparison processing of the matching determination, specifically, when the matching degree is equal to or greater than the first threshold, the matching data model is determined to be matching with the data set group 101.

In addition, by notifying the storage system 1000 of information used for identifying the data model in response to the write request, a method of determining that a data model designated by the user matches with the data set group 101 may be used.

If the determination result of S102 is false (S102: N), the processor 1130 adds the new data model and the input vector, which are generated in the encoding processing and with which the key of the data set group 101 is associated, to the model dictionary 150 (S103).

If the determination result of S102 is true (S102: Y), the processor 1130 updates (for example, adds the write destination address to the key) the key, which is associated with the matching data model, and the input vector (S104). The input vector includes difference information of the matching data model and the data set. However, cases such as one where there is no difference at all, and a case where there is no need to store the input vector are conceivable. Accordingly, at least write of overlapped data model is avoided, and write of the input vector is also avoided in some cases. Accordingly, a further reduction of the data amount can be expected. The matching determination in S102 may be performed asynchronously with the write processing. That is, the processor 1130 may temporarily store the data model and the input vector of the write target data set group 101 in the model dictionary 150, and periodically (or non-periodically) determine whether there is overlapping of the data model and the input vector in the model dictionary 150. If the determination result thereof is true, the processor 1130 may delete the overlapped data model and input vector from the model dictionary 150.

The processor 1130 returns a completion response for the write request (S105). Note that the completion response may be returned when S103 or S104 is performed, or may be returned when the data set group 101 is stored in the memory 1120.

The data model may be based on a normalized maximum value (for example, "1") and a normalized minimum value (for example, "0"), which are values obtained by normalizing a maximum value 108 and a minimum value 107 in the data set group 101, respectively. Accordingly, the probability of finding a matching data model (or a similar data model to be described below) is improved.

Further, the input vector includes the following (a) to (d):
(a) the maximum value 108 (the maximum value before normalization) in the data set group 101;
(b) the minimum value 107 (the minimum value before normalization) in the dataset group 101;
(c) an input value 105 for the data model; and
(d) difference information 106 indicating a difference between the data set group 101 and a pattern 103. When a neural network in which an input value is static (for example, a value of an x-axis (time axis in FIG. 8) in the data 100) is used as the data model, at least the input value

105 of the input vector can be omitted since there is no need to remember the value of the x-axis. When a generation model such as an automatic encoder is used as the data model, the input value 105 may be a feature amount vector or the like. The pattern 103 is a data set group output from the data model when the input value 105 is input to the data model. Information of (a) and (b) may be omitted, but since there are (a) and (b), reduction of an information amount of (d) can be expected. Further, (d) may be omitted.

By reflecting the difference information 106 (and the minimum value 107 and the maximum value 108) of the input vector in the pattern 103 (data set group), which is output from the data model by inputting the input value 105 in the input vector to the data model, the data set group 101 having no error can be restored. Note that (d) (difference information 106) may be compressed, and the input vector may include (a) to (c) and the compressed (d). Accordingly, reduction of the data amount of the input vector can be expected. The compression of (d) may follow an existing compression method. Further, the compression may be a software processing or a hardware processing. Also, (c) itself may be a compression target. When a compression method using prediction probability distribution of symbols is used for the compression of (c) and (d), the data model may be used for prediction of the probability distribution as described above. In this case, different data models may be used for (c) and (d) respectively, and the data models used may be collectively handled as a data model.

<Read Processing of Data Set Group 101>

The processor 1130 receives a read request of the data set group 101 (S121). The read request is associated with a read source address.

The processor 1130 identifies, from the model dictionary 150, a data model and an input vector that correspond to a key including the read source address. The processor 1130 performs a decoding processing that includes a processing of restoring the data set group by inputting the identified input vector to the identified data model (S122). The processor 1130 returns the restored data set group 101 (S123).

<Retrieval Processing of Data Set Group 101>

The processor 1130 receives a retrieval request (S131). The retrieval request is associated with a retrieval condition. As the retrieval condition, various conditions can be adopted. For example, the retrieval condition is a retrieval target data set group 101 itself or a data model of the data set group 101.

The processor 1130 retrieves from the model dictionary 150 a target data model that is a data model matching with the retrieval condition (S132). For example, when the retrieval condition is the data set group 101, the processor 1130 generates a data model of the retrieval condition (the data set group 101) by performing an encoding processing, and retrieves a target data model (for example, a matching degree thereof is smaller than the first threshold) that matches with the data model. In addition, for example, when the retrieval condition is a data model of the data set group 101, the processor 1130 retrieves a target data model (for example, a matching degree thereof is smaller than the first threshold) that matches with the data model.

When the target data model is found, the processor 1130 acquires a key, which is associated with the found target data model, from the model dictionary 150 (S133), and returns the acquired key (S134).

That is, according to the retrieval processing, the processor 1130 returns the key associated with the target data model, instead of restoring the data set group based on the target data model and returning the data set group. Accordingly, it is unnecessary to transfer the data set group to the retrieval request source. In the retrieval processing, comparison between data models is performed without performing of restoration of the data set group and comparison between data set groups. For this reason, the load of the retrieval processing is small, and thus it can be expected that the retrieval processing is performed at a high speed. A model hash table 402 to be described below and the like may be used for the retrieval processing.

The above is the overview of the examples of the write processing, the read processing, and the retrieval processing of the data set group 101.

If there is a similar data model whose matching degree with a data model of the data set group 101 is equal to or greater than a second threshold and less than the first threshold (first threshold>second threshold), the processor 1130 may generate a data model, which includes a model ID of the similar data model and difference data between the similar data model and the data model of the data set group 101, as a data model of the data set group 101. Accordingly, reduction of the data amount of the data model can be expected, and thus reduction of the size of the model dictionary 150 can be expected. Further, for example, in cases such as one where an automatic encoder is used as a data model, it is conceivable that an encoder and a decoder of the automatic encoder are commonly used by a plurality of different data set groups 101. In this case, one data model is associated with a plurality of different data set groups 101, an input vector with respect to the data model associated with each of the plurality of different data set groups 101 may be stored in the model dictionary 150, including reference relationships thereof, and the size of the model dictionary 150 may be reduced by communizing the data model.

When the storage system 1000 is configured with a plurality of nodes (an example of a physical storage device), the plurality of nodes may share the model dictionary 150. Accordingly, efficient data storage can be expected.

As described above, the data model is a binary string that represents regularity of a mathematical expression processing, of a waveform shape, and of probability distribution. The data model is input an input vector and outputs a data set group. As the data model, for example, a general neural network, a generation model (for example, Gaussian mixture models (GMM), hidden markov model (HMM), stochastic context-free grammar (SCFG), generative adversarial nets (GAN), or variational auto encoder (VAE)), genetic programming, or the like may be used. Further, model compression such as Mimic Model may be applied to reduce the information amount of the data model.

With respect to compression of irreversible conversion, the processor 1130 can perform a processing of generating error information, which is information based on an error between a write target data set group and a data set group as an output from a data model and based on an allowable error. That is, error information can be adopted instead of difference information. The processor 1130 may store, in the logical storage device 1600, an input vector including the generated error information, in addition to a data model with which a key of the write target data set group is associated. A decompressed data set group may be a data set group output from a data model, and may be a data set group that is corrected using error information in an input vector associated with the data model. If an allowable error is 0 (that is, no error is allowed), the decompressed data set group is the same as the data set group before the encoding processing. If the allowable error is larger than 0, there is an error less than or equal to the allowable error between the decompressed data set group and the data set group before the encoding processing. In the present embodiment, the first threshold (the threshold used in the matching determination) is a variable value, and tends to be small when the allowable error is large. Since at least one of the following can be expected when the allowable error is larger than 0, a further reduction of the data amount can be expected.

Error information is more likely to be compressed than difference information.

A range of matching of the data model is widened, and as a result, more data models can be deleted.

The table group 1150 may include a store management table (not shown). The store management table may store information for each data store (for example, a database table), such as a store ID (an ID of a data store), meta information, forgetting control information, and outcome information.

The meta information is meta information of the data store, and may include, for example, at least one of the number of columns, a column name, a start time point, and an input frequency. The meta information further includes an allowable error. Note that the allowable error may be associated with a unit of the data model instead of being associated with a unit of the data store. The meta information may further include the first threshold (the threshold used in the matching determination).

The forgetting control information is information for controlling forgetting of a data store, and specifically, may be information for adjusting an allowable error corresponding to the data store and for adjusting a correction error of a data set, among a data set group output from a data model belonging to the data store, outside an allowable error range. In the present embodiment, an output data set whose error is within the allowable error range is corrected based on the error and the allowable error range, but the "correction error" may be an error of the output data set after the correction. The forgetting control information may be, for example, forgetting curve information. The forgetting curve information may be information indicating dynamic changes (for example, Ebbinghaus forgetting curve) due to lapse of time of a storage degree (for example, resolution and frequency). The forgetting curve information may be referred to in a first error adjustment processing that is a correction error adjustment processing. In the present embodiment, in addition to (or instead of) the first error adjustment processing, a second error adjustment processing that is an allowable error adjustment processing may be performed. At least one of the first and second error adjustment processings may be performed when a use processing to be described below takes place, or may be performed when the outcome information is updated, or may be performed when a usage rate of all the data stores exceeds a threshold value.

The outcome information may include objective information (for example, key performance indicator (KPI)) that is information indicating an objective (for example, an objective of an application such as a data analysis application), and achievement degree information that is information indicating an objective achievement degree. The outcome information may further include a lower limit value of the objective achievement degree.

For example, a store ID, a mode ID, a key, and a write target (data model or data set group) may be associated with a write request. As the mode ID, any of a "model" (a write target data model) and a "data set group" (a write target data set group) may be designated. The key may include at least a part of record information such as the column name and the time point (for example, information corresponding to an address of a storage destination).

The processor 1130 may refer to a record (a record in the store management table) corresponding to a store ID designated according to the write request, and performs a determination D whether the designated mode ID is the "model". If a result of the determination D is false, the processor 1130 may perform the encoding processing on the write target data set group. Specifically, for example, the processor 1130 may performs a matching determination whether there is a matching data model whose matching degree with a write target data model is equal to or greater than the first threshold. In this matching determination, the first threshold referred to is a variable value, and tends to be small when the allowable error corresponding to the data store to which the data model belongs is large. If a result of the matching determination is true, the processor 1130 may complete a new input vector by generating error information that is information based on an error between a data set group and a pattern (a data set group as an output from the matching data model) and based on the allowable error, and by compressing the generated error information. If a result of the matching determination is false, the processor 1130 may generate the error information, which is information based on the error between a data set group and a pattern (a data set group as an output from a data model) and based on the allowable error, after a predetermined processing (for example, storing a generated data model) is performed, and compress the generated error information. The error information may be, for example, an array of a plurality of correction values corresponding to a plurality of data sets constituting a pattern.

If the result of the determination D is true (or after the encoding processing described above), the processor 1130 may perform a determination E whether to store. If a matching data model is found in the encoding processing, a result of the determination E is true. If a matching data model is not found in the encoding processing, the result of the determination E is false. When the encoding processing is not performed, a matching determination whether there is a data set group matching with the write target data set group may be performed in the determination E, or the result of the determination E may be true without performing such a determination.

If the result of the determination E is true, the processor 1130 may store, for example, the write target data model (a data model associated with the write request, or a data model generated in the encoding processing), a key associated with the write request, a model ID of the data model, and an input vector corresponding to the data model.

A read request may be associated with a store ID, a mode ID, and a key. As the mode ID, any one of a "model" (return of a data model) and a "data set group" (return of a data set group) may be designated. The key may include at least a part of record information such as the column name and the time point (for example, information corresponding to an address of a storage destination).

The processor 1130 may refer to a record (a record in the store management table) corresponding to a store ID designated according to the read request, and identifies a model ID and an input vector corresponding to a key associated with the read request. The processor 1130 may identify a data model corresponding to the identified model ID, and perform a determination F whether the mode ID is the "model".

If a result of the determination F is false, the processor 1130 may input the identified input vector to the identified data model to perform a decoding processing of restoring the data set group. For example, the processor 1130 may obtain a data set group (a pattern) by inputting an input value in the input vector to a data model, obtain a decompressed data set group by performing an error information processing (for example, using error information in the input vector to correct the obtained data set group (pattern)), and return the decompressed data set group.

If the result of the determination F is true, the processor 1130 may return the identified data model (and the input vector).

Figure 9:
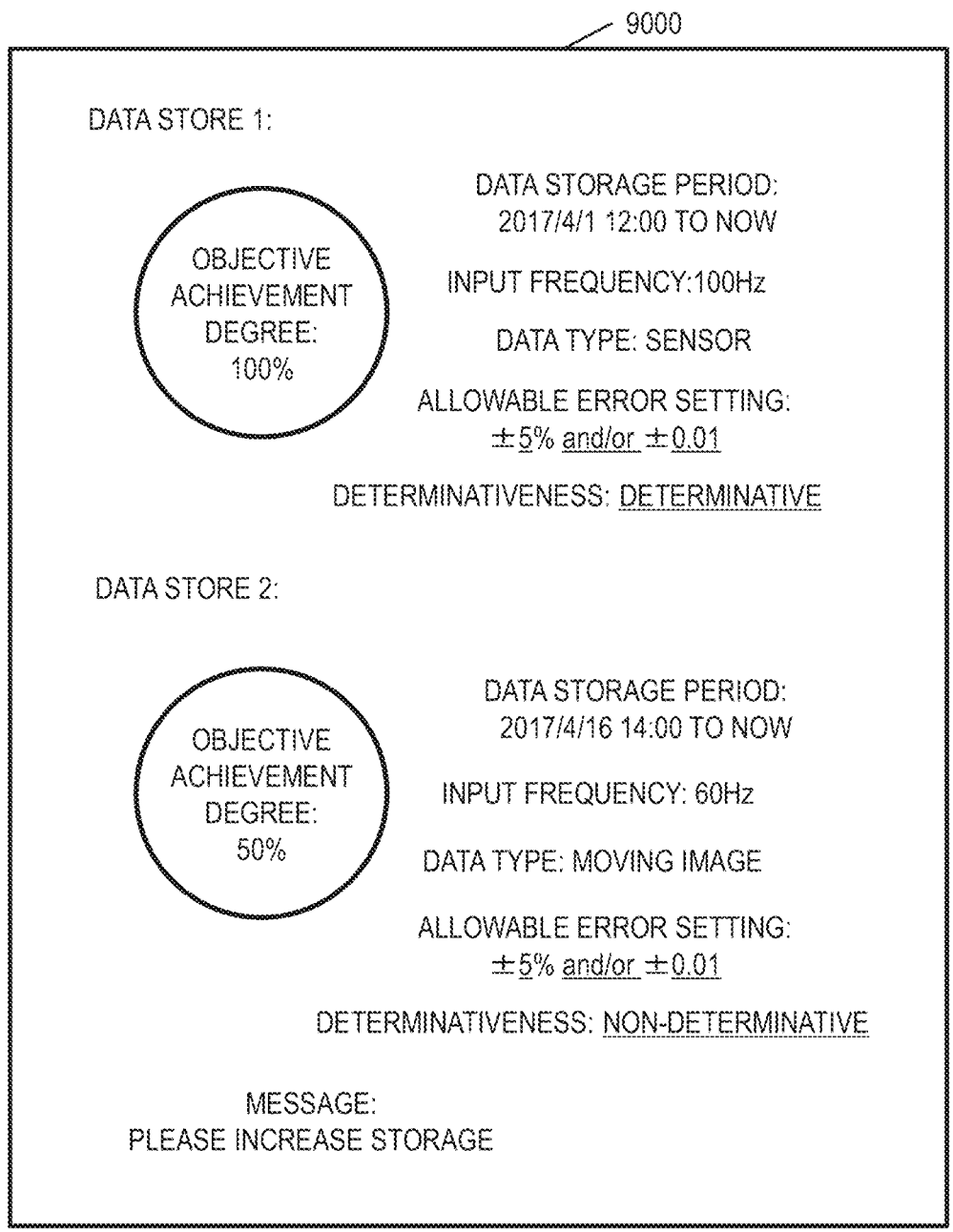
FIG. 9 illustrates an overview of an outcome setting GUI.

FIG. 9 illustrates an overview of an outcome setting GUI.

The processor 1130 displays an outcome setting GUI 9000 illustrated in FIG. 9 based on the store management table, for example, on the user system 1200 (or a management system). Other types of screens may be adopted instead of the GUI (the same also applies to the user support GUI).

The processor 1130 displays, for example, the following for each data store.
An objective achievement degree in the outcome information;
A data storing period in meta information (a period from the date and time when data is stored in the data store);
A data type in the meta information;
An allowable error in meta information; and
Determinativeness in meta information.

The objective achievement degree may be information input by the user, or may be information periodically calculated and updated with a predetermined method.

The "allowable error" may be designated with, for example, a rate, or a constant value (for example, when a constant value of 0.01 is to be designated, the constant value is valid to the second decimal place).

The "determinativeness" means whether it is maintained that the same data set group is to be returned whenever a read request is received for a data store. The term "determinative" means it is maintained that the same data set group is to be returned. The term "non-determinative" means it is not maintained that the same data set group is to be returned. The forgetting control information corresponding to a data store in which the "determinative" is adopted is information indicating that there is no forgetting, that is, information indicating that none of the first and second error adjustment processings is performed. This is because when the correction error or the allowable error changes dynamically, the data set group to be restored is different.

In FIG. 9, underlined information elements are examples of information elements that can be set and changed by the user. That is, in the present embodiment, that whether the allowable error is designated with either (or both) of a rate and a constant value, and the determinativeness are information elements that can be set and changed by the user.

Note that there is a presentation of increasing a storage capacity for "data store 2", which reads "please increase the storage". It is because that it is essential to reduce the error in the future to make the objective achievement degree equal to or higher than a user-desired achievement degree, and that as a result, the degree of reduction of the data amount is expected to decrease. When there is already a sufficient free storage capacity, such a presentation may not be given. The processor 1130 may periodically or non-periodically (for example, when a display request of the GUI 9000 is received from the user when the second error adjustment processing is performed) determine whether the objective achievement degree corresponding to the data store is equal to or higher than the user-desired achievement degree, and may give the presentation described above of increasing the storage when a result of the determination is false. The determination may be performed based on a user-desired achievement degree (a lower limit of the objective achievement degree in the outcome information) input in advance, or may be performed based on an answer from the user to a question whether the user-desired achievement degree is reached.

Figure 10:
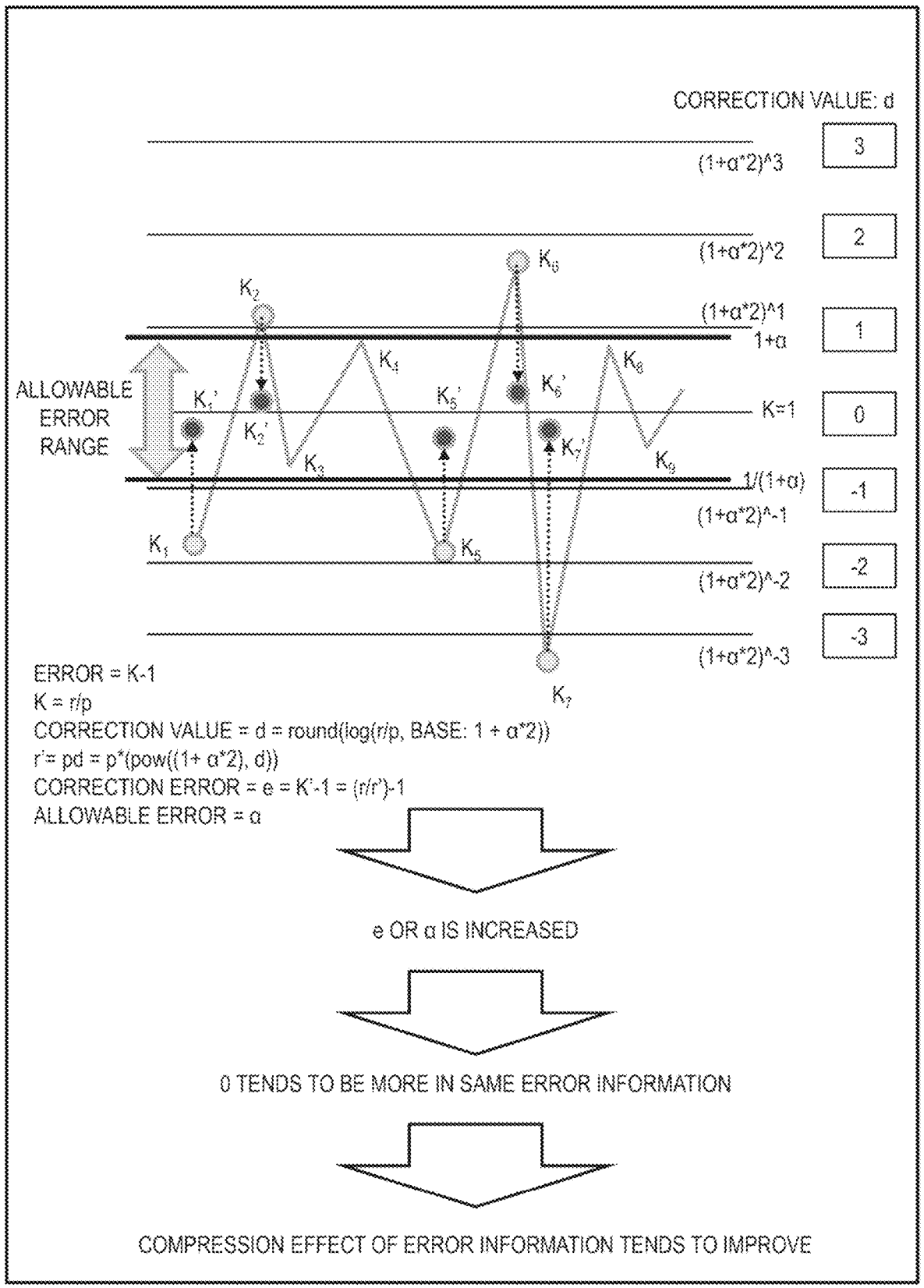
FIG. 10 illustrates an example of a relationship between an allowable error and a correction value.

FIG. 10 illustrates an example of a relationship between the allowable error and the correction value. Although it may be assumed that each data set (value) constituting the data set group before modeling is a positive real number, the invention can be applied by storing information on being positive and negative even if at least one data set in the data set group before modeling is a negative value. Further, although FIG. 10 is based on an example of a case where the error is designated with a rate (error rate), the invention can also be applied to a case where the error is designated with a constant value.

In FIG. 10, K ($K_1$ to $K_9$) is r/p, in which r is a data set in a data set group before modeling, and p is a data set in a pattern. Accordingly, when there is no error, K=1. Accordingly, the error=K−1. As K deviates away from 1, the error increases.

In FIG. 10, the allowable error is α. When K is taken as a base, the allowable error range is represented as $1/(1+\alpha)$ or more and $1+\alpha$ or less.

The error information is an array of a plurality of correction values d respectively corresponding to a plurality of output data sets constituting a pattern (an output data set group from a data model). As α or e (correction error) decreases, d (and the number of digits of d) tends to increase. In other words, d (and the number of digits of d) tends to decrease as α or e increases. As α or e decreases, d approaches 0 (an example of a predetermined value). Accordingly, as α or e decreases, the number of 0 increases in the error information, and as a result, the error information is likely to be compressed. As described above, the error information is generated in the encoding processing.

In the present embodiment, for an output data set corresponding to K within the allowable error range, correction is unnecessary, that is, d=0. According to the example of FIG. 10, correction of output data sets corresponding to $K_3$, $K_4$, $K_8$, and $K_9$ respectively is unnecessary.

On the other hand, for a data set corresponding to K outside the allowable error range, correction is necessary, that is, d>1. Specifically, d is determined such that K falls within the allowable error range. K'=r/r', and r'=pd, that is, r' is p that is corrected using d. If there is no error in a corrected data set r', K'=1. According to the example of FIG. 10, correction values d for output data sets corresponding to $K_1$, $K_2$, $K_5$, $K_6$, and $K_7$ respectively are determined such that $K_1$, $K_2$, $K_5$, $K_6$, and $K_7$ become $K_1'$, $K_2'$, $K_5'$, $K_6'$, and $K_7'$ respectively in the allowable error range. Specifically, the correction value d is obtained by rounding off a value of log (r/p, with a base: 1+α*2) at the first decimal place, and r' is p*(1+α*2) d. The correction error e is K'−1=(r/r')−1, and e≤α.

The first and second error adjustment processings may be performed.

The first error adjustment processing may be performed, for example, for each data store (hereinafter, one data store is taken as an example ("target data store" in the description of the first error adjustment processing). The processor 1130 may increase the correction error within the allowable error range. Specifically, for example, the processor 1130 may identify an allowable error corresponding to the target data store from the store management table, identify a data model that belongs to the target data store, and with respect to an output data set having a correction error ($e=r/r'-1$ according to the example of FIG. 10) among one or more output data sets constituting a data set group output from the identified data model, increases the correction error of the output data set within the allowable error range according to a predetermined rule (the "predetermined rule" is a rule indicated by forgetting control information corresponding to the target data store). With respect to each data model belonging to the target store, the processor 1130 may read the input vector and error information, decompress the error information in the read input vector, update the decompressed error information based on a result of increasing the correction error, compress the updated error information, and store (for example, overwrite) the input vector including the compressed error information. The processor 1130 may reduce the first threshold based on the result (for example, an average value of the correction error) of increasing the correction error. For example, a relationship between the correction error and the first threshold may be defined in advance. The first threshold may be reduced based on the relationship. If change of the first threshold is unnecessary even if the correction error is increased (for example, if the change of the correction error is so little that change of the first threshold is unnecessary), reducing the first threshold value may be skipped.

The second error adjustment processing may also be performed, for example, for each data store (hereinafter, one data store is taken as an example ("target data store" in the description of the second error adjustment processing). The processor 1130 may increase the allowable error. Specifically, for example, the processor 1130 may receive an allowable error increased by the user as an allowable error corresponding to the target data store, set the allowable error in the store management table, and identify an allowable error corresponding to the target data store from the store management table. If an objective achievement degree in the outcome information corresponding to the target data store is relatively high (for example, if a present objective achievement degree is higher than the user-desired achievement degree), the processor 1130 may increase the allowable error. An increase amount of the allowable error may be determined based on at least one of a predefined relationship between the objective achievement degree and the allowable error and a past history of relationships between the objective achievement degree and the allowable error. With respect to each data model belonging to the target store, the processor 1130 may read the input vector and error information, decompress the error information in the read input vector, update the decompressed error information based on a result of increasing the allowable error, compress the updated error information, and store (for example, overwrite) the input vector including the compressed error information. The processor 1130 may reduce the first threshold based on the result (for example, the updated allowable error) of increasing the allowable error. A relationship between the allowable error and the first threshold may be defined in advance, for example. The first threshold may be reduced based on the relationship. If change of the first threshold is unnecessary even if the allowable error is increased (for example, if the change of the allowable error is so little that change of the first threshold is unnecessary), reducing the first threshold value may be skipped.

Figure 11:
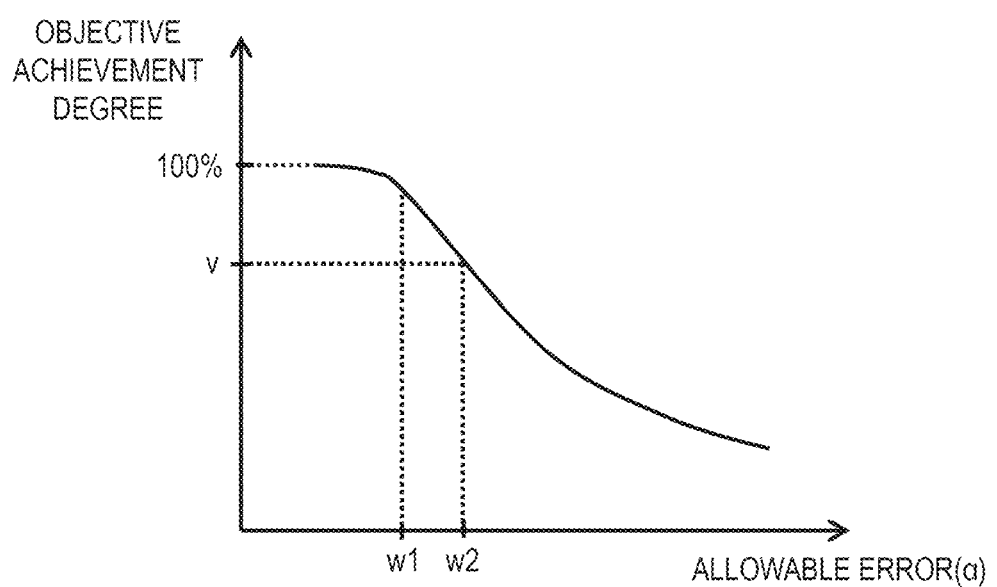
FIG. 11 illustrates an example of a relationship between an objective achievement degree and an allowable error.

According to the second error adjustment processing, it can be expected that compared with the user-desired achievement degree, the storage capacity of overspec is reduced. For example, as illustrated in FIG. 11, when a present allowable error is w1 while the user-desired objective achievement degree is v, data with excessively high accuracy is stored for the user. Accordingly, by increasing the allowable error from w1 to w2 corresponding to the objective achievement degree v, although accuracy of the data set group restored from the data model decreases, it can be expected to maintain the user-desired achievement degree and reduce the storage capacity.

The above description can be summarized as follows. Note that the following summary may include matters (for example, a modification) that are not in the above description.

In the storage system 1000 that includes the storage device 1600, the memory 1120, and the processor 1130 for controlling input and output of data to and from the storage device 1600, the processor 1130 monitors a storage amount and a read amount. The storage amount is at least one of a write amount and a physical use amount. The write amount is a total amount of data received as a write target. The physical use amount is a total amount of data physically stored in the storage device 1600. The processor 1130 calculates a fee as a storage cost that is a cost related to use of the storage device in a target period, based on a storage amount and a read amount in the target period in accordance with a monitoring result. A fee per unit amount of the read amount may be higher than a fee per unit amount of the storage amount in the target period, and in this case, the processor 1130 may reduce the fee corresponding to the storage amount and the read amount in the target period in accordance with a read amount in the past before the target period.

The processor 1130 may further determine the fee in the target period based on the read amount in the past before the target period. Accordingly, in a case where the fee per unit amount of the storage amount is lower than the fee per unit amount of the read amount and the fee is high when the read amount is large, the fee (storage cost) can be reduced by considering a read amount before the target period as a paid fee.

The processor 1130 performs a data amount reduction processing, which is at least one of compression and deduplication, to reduce the amount of data stored in the storage device 1600, and the processor 1130 may increase a data amount reduction rate of the data stored in the storage device 1600 according to time elapse from a write time point of the data. Accordingly, the physical use amount can be efficiently reduced, thereby contributing to the optimization of the storage cost.

The processor 1130 performs a data amount reduction processing, which is at least one of compression and deduplication, to reduce the amount of data stored in the storage device 1600, and the processor 1130 may calculate the fee in the target period based on a determined logical storage cost in the target period. The logical storage cost may be a fee per unit amount of a write amount, and may be a fee determined based on the physical use amount and on a physical storage cost that is a fee per unit amount of the physical use amount. Accordingly, it can be expected to optimize the logical storage cost as the physical use amount decreases.

The logical storage cost may be a fee determined based on the read amount and on a read cost that is the fee per unit amount of the read amount. Accordingly, it can be expected to optimize the logical storage cost according to the read amount.

The processor 1130 may predict a physical use amount of a future period that is a certain period in the future from the target period, based on a time-series physical use amount before the target period. The processor 1130 may predict a read amount of the future period, based on a time-series read amount before the target period. The processor 1130 may determine a logical storage cost of the future period, based on the predicted physical use amount, the physical storage cost, the predicted read amount, and on the read cost.

The processor 1130 may predict a physical use amount of a future period that is a certain period in the future from the target period, based on a time-series physical use amount before the target period. The processor 1130 may determine a logical storage cost of the future period based on the predicted physical use amount and on the physical storage cost.

If the logical storage cost of the future period determined as described above is displayed, since the logical storage cost serving as a base for the fee the user is charged for the future period is determined based on the physical use amount and the read amount predicted for the future period, the profitability (reduction in risk for the storage business operator) of the storage business operator can be maintained, and it can be maintained that (risk reduction on the user side) the fee per unit amount for the storage amount decreases with lapse of time. An actual measured value, instead of predicted values of the physical use amount and the read amount for the target period, may be adopted as the base of the logical storage cost. But when the actual measured value is taken as the base, a probability is considered that if at least one of the physical use amount and the read amount rapidly increases or decreases in the target period, the logical storage cost may also rapidly increase or decrease in the target period. In order to reduce such a probability, it is considered that it is preferred to adopt a predicted value.

The physical storage cost, which is the fee per unit amount of the physical use amount, is common to a plurality of users of the storage device 1600, and the processor 1130 may calculate, for each user, a fee in the target period for the user based on a data amount reduction rate of data that is taken as a write target for the user.

The processor 1130 may receive one or more cost conditions designated by the user as cost conditions that are conditions related to the fee in the target period. The processor 1130 may perform a data amount reduction processing for maintaining that the one or more cost conditions are satisfied. In this case, for example, the processor 1130 may receive one or more reduction conditions designated by the user as reduction conditions that are conditions related to the data amount reduction processing. The processor 1130 may determine whether the data amount reduction processing for maintaining that one or more cost conditions are satisfied satisfies one or more reduction conditions, and may issue an alert if a result of the determination is false.

The processor 1130 performs a lossy compression processing to reduce the data amount stored in the storage device 1600, and the processor 1130 may monitor a frequency, which is taken as a read target, related to data stored in the storage device. The processor 1130 may perform a lossy compression processing on data, which is taken as a read target at a relatively low frequency, among the data stored in the storage device 1600.

The processor 1130 performs a data amount reduction processing, which is at least one of compression and deduplication, to reduce the amount of data stored in the storage device 1600, and the processor 1130 may control a data reduction rate of the data in accordance with a read frequency of the data volume stored in the storage device 1600. For example, the processor 1130 may make the data amount reduction rate of data taken as a read target at a relatively high frequency lower than the data amount reduction rate of data taken as a read target at a relatively low frequency. Accordingly, it is expected that the value is regarded as the read frequency and the storage cost is set according to the value.

Figure 12:
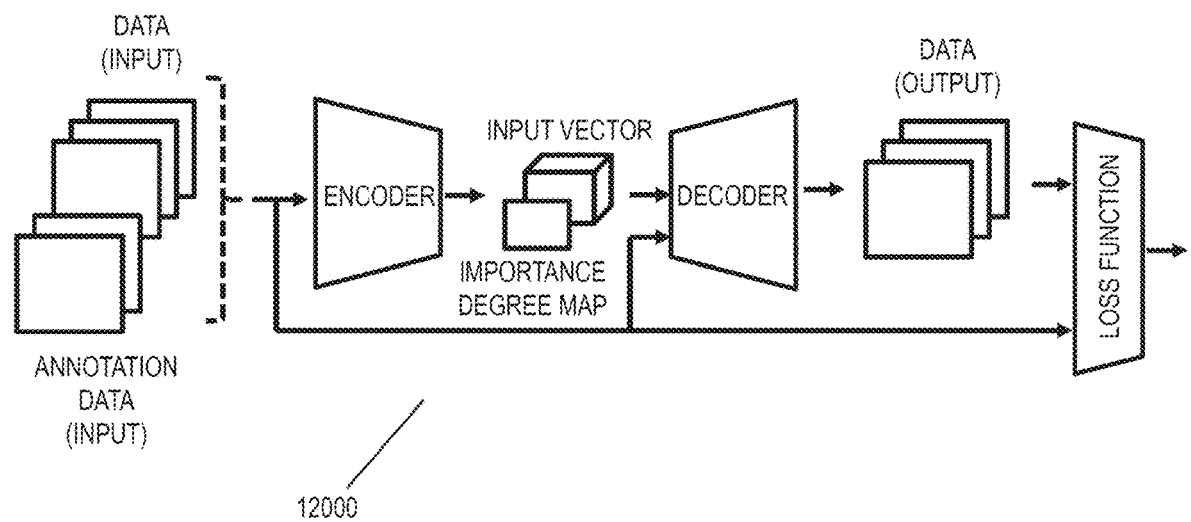
FIG. 12 illustrates an example of an overview of a processing in a case where an automatic encoder is used as a data model.

Further, FIG. 12 illustrates an overview 12000 of a processing in a case where an automatic encoder is used as a data model and in a case where the user designates an importance degree for all or apart of the data set group 101 (hereinafter, simply referred to as data) using the error objective function setting 6015 or the like. The data model includes an encoder and a decoder. The encoder takes data and annotation data as inputs, and outputs an input vector and an importance degree map (to the decoder).

The importance degree map is a mechanism for dividing an information amount of the input vector into an important part in the input vector output by the encoder, and represents a data amount (bit amount or the like) for each area of the input vector. For example, the entire network may be learned by an encoder or another neural network to cause the importance degree map to be automatically output in conjunction with the input vector. By using a data compression method such as Context Adaptive Arithmetic Coding in combination, and by controlling an appearance probability of symbols representing the input vector without using the importance degree map, the data model may be caused to perform learning so as to divide the information amount into an important part.

The data may be an array of numerical values of any dimension. For example, in a case of sensor data, the array is of two-dimension of sensor×time frame, in a case of image data, the array is of three-dimension of color space×length×width, and in a case of moving image data, the array is of four-dimension of color space×length×width×time frame.

The annotation data is auxiliary information corresponding to the data. For example, the annotation data is data indicating an importance degree of an area corresponding to data designated by the user, and is, for example, numerical value array data having a dimension corresponding to data. The annotation data may be transmitted to the storage system 1000 together with data from, for example, an image recognition application, or may be generated based on data using a commonly known method by the storage system 1000. By inputting the annotation data to the encoder, the encoder can efficiently learn a generation rule of the importance degree map. A neural network other than the encoder is used for generating the importance degree map, and the annotation data may be input to the neural network to cause the neural network to learn.

The encoder and the decoder may use a convolutional neural networks (CNN) of a dimension corresponding to the dimension of the data. For example, in a case of image data, 2D-CNN can be used (a color space of the data and a dimension of the annotation information are used in an input channel of the CNN), and in a case of moving image data, 3D-CNN can be used (a color space of the data and a dimension of the annotation information are used in the input channel of the CNN).

The input vector is input data to the decoder, and the decoder receives the input vector as an input, restores the data to a shape of original data, and outputs the data.

When an automatic encoder is used as a data model in a data write processing, the input vector is stored, and the decoder is recorded as a data model in association with the input vector. The input vector is subjected to a mask processing using the importance degree map, and thereafter is stored in a state in which the information amount is reduced. Since the decoder can generate data based on the input vector even when the encoder is not stored, the encoder may be deleted without being stored. Alternatively, in order to reuse the encoder and make the processing efficient, the encoder may be taken as a data model and stored in combination. Further, at the time of storing the input vector or the data model, the data may be quantized, and data compression may be performed using a data compression method such as the Context Adaptive Arithmetic Coding described above to further reduce the data amount.

The decoder may take the original data, the annotation data or information converted by another neural network as auxiliary inputs.

The loss function is a function that is a learning objective of the entire neural network and that is set through the error objective function setting 6015. For example, in a case of image or moving image data, an indicator such as mean squared error (MSE), Peak signal-to-noise ratio (PSNR), or multi-scale structural similarity (MS-SSIM) is used. In accordance with the importance degree of each area designated by the annotation data, each indicator may be calculated by changing a weight or an objective, and the loss function may be set so as to preferentially learn an important area.

For efficiency, the loss function may be combined with the methods described above, including a neural network such as image segmentation and object recognition. For efficiency, a generative adversarial network (GAN) method may be combined and a Discriminator neural network may be included in the loss function.

Although one embodiment has been described above, the embodiment is an example for illustrating the invention, and the scope of the invention is not intended to be limited to the embodiment. The invention can be implemented in various other forms. Specifically, for example, as illustrated in FIG. 7, the storage control unit 141 may refer to the page table 1144, identify a logical page 701H having a relatively high read frequency (for example, a logical page having a read frequency equal to or greater than the first threshold) and a logical page 701L having a relatively low read frequency (for example, a logical page having a read frequency equal to or smaller than the first threshold, or less than the second threshold that is smaller than the first threshold), and performs a lossy compression (for example, forgetting) in which a data amount of data in the logical page 701L is reduced more than a data amount of data in the logical page 701H.

What is claimed is:

1. A storage system comprising:
   a storage device;
   a memory; and
   a processor configured to control input and output of data to and from the storage device, wherein
   the processor monitors a storage amount and a read amount,
      the storage amount is at least one of a write amount and a physical use amount,
         the write amount is a total amount of data received as a write target, and
         the physical use amount is a total amount of data physically stored in the storage device, and
   the processor calculates a fee as a storage cost that is a cost related to use of the storage device in a target period, based on a storage amount and a read amount in the target period in accordance with a result of the monitoring.

2. The storage system according to claim 1, wherein
the processor further determines a fee in the target period based on a read amount in a period before the target period.

3. The storage system according to claim 1, wherein
the processor performs a data amount reduction processing, which is at least one of compression and deduplication, to reduce an amount of data stored in the storage device, and
the processor increases a data amount reduction rate of the data stored in the storage device according to an elapsed time from a write time point of the data.

4. The storage system according to claim 1, wherein
the processor performs a data amount reduction processing, which is at least one of compression and deduplication, to reduce an amount of data stored in the storage device, and
the processor calculates a fee in the target period based on a logical storage cost determined for the target period, and
the logical storage cost is a fee per unit amount of the write amount, and is a fee determined based on the physical use amount and a physical storage cost that is a fee per unit amount of the physical use amount.

5. The storage system according to claim 4, wherein
the logical storage cost is a fee determined based on the read amount and a read cost that is a fee per unit amount of the read amount.

6. The storage system according to claim 5, wherein
the processor
   predicts a physical use amount of a future period that is a certain period after the target period, based on a time-series physical use amount before the target period,
   predicts a read amount of the future period, based on a time-series read amount before the target period, and
   determines the logical storage cost of the future period, based on the predicted physical use amount, the physical storage cost, the predicted read amount, and the read cost.

7. The storage system according to claim 5, wherein
the processor
   predicts a physical use amount of a future period that is a certain period after the target period, based on a time-series physical use amount before the target period, and
   determines the logical storage cost of the future period, based on the predicted physical use amount and the physical storage cost.

8. The storage system according to claim 1, wherein
a physical storage cost, which is a fee per unit amount of the physical use amount, is common to a plurality of users of the storage device, and
the processor calculates, for each user, a fee in the target period for the user based on a data amount reduction rate of data taken as a write target for the user.

9. The storage system according to claim 1, wherein
the processor receives one or more cost conditions designated by a user as cost conditions that are conditions related to a fee in the target period, and the processor performs a data amount reduction processing for maintaining that the one or more cost conditions are satisfied.

10. The storage system according to claim 9, wherein
the processor receives one or more reduction conditions designated by a user as reduction conditions that are conditions related to the data amount reduction processing, and
the processor determines whether the data amount reduction processing for maintaining that the one or more cost conditions are satisfied satisfies the one or more reduction conditions, and issues an alert if a result of the determination is false.

11. The storage system according to claim 1, wherein
the processor performs a lossy compression processing to reduce an amount of data stored in the storage device,
the processor monitors a frequency of data, which is taken as a read target, stored in the storage device, and
the processor performs the lossy compression processing on data, which is taken as a read target at a relatively low frequency, among the data stored in the storage device.

12. The storage system according to claim 1, wherein
the processor performs a data amount reduction processing, which is at least one of compression and deduplication, to reduce an amount of data stored in the storage device, and
the processor controls a data reduction rate of the data in accordance with a read frequency of the data stored in the storage device.

13. The storage system according to claim 12, wherein
the processor makes a data amount reduction rate of data taken as a read target at a relatively high frequency lower than a data amount reduction rate of data taken as a read target at a relatively low frequency.

14. A cost optimization method, comprising:
when write target data is received, storing the data to a storage device and recording a write time point of the data to a memory, and
calculating a fee related to use of the storage device in a target period, based on a data amount related to a write and an elapsed time from a write time point of data taken as a write target to the target period.

15. A computer program for causing a computer to execute a processing, the processing comprising:
when write target data is received, storing the data to a storage device and recording a write time point of the data to a memory, and
calculating a fee related to use of the storage device in a target period, based on a data amount related to a write and an elapsed time from a write time point of data taken as a write target to the target period.

* * * * *